(12) United States Patent
Hamamura

(10) Patent No.: US 6,700,619 B1
(45) Date of Patent: Mar. 2, 2004

(54) ELECTRONIC STILL CAMERA WITH FEEDBACK CONTROL

(75) Inventor: Toshihiro Hamamura, Osaka (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/081,585

(22) Filed: May 19, 1998

(30) Foreign Application Priority Data

May 20, 1997 (JP) .............................................. 9-129188

(51) Int. Cl.⁷ .......................... H04N 5/222; H04N 5/228
(52) U.S. Cl. ..................................... 348/370; 348/222.1
(58) Field of Search .......................... 348/224.1, 223.1, 348/228.1, 229.1, 221.1, 370, 371, 362, 363, 296, 297, 348; 396/234, 334

(56) References Cited

U.S. PATENT DOCUMENTS

| | | | |
|---|---|---|---|
| 4,693,582 A | 9/1987 | Kawamura et al. | 354/403 |
| 4,937,676 A | 6/1990 | Finelli et al. | 358/229 |
| 5,317,362 A | 5/1994 | Takahashi | |
| 5,376,964 A * | 12/1994 | Soga et al. | 348/229 |
| 5,438,367 A * | 8/1995 | Yamamoto et al. | 348/371 |
| 5,617,141 A * | 4/1997 | Nishimura et al. | 348/366 |
| 5,745,808 A * | 4/1998 | Tintera | 396/236 |
| 5,768,540 A * | 6/1998 | Iwasaki | 396/234 |
| 5,815,200 A * | 9/1998 | Ju et al. | 348/229 |
| 5,831,676 A * | 11/1998 | Takahashi et al. | 348/362 |
| 5,978,027 A * | 11/1999 | Takeda | 348/348 |
| 5,991,549 A * | 11/1999 | Tsuchida | 396/158 |
| 6,075,562 A * | 6/2000 | Sakaguchi et al. | 348/223 |

FOREIGN PATENT DOCUMENTS

| | | |
|---|---|---|
| JP | 04-366826 A | 12/1992 |
| JP | 07-203269 A | 8/1995 |

\* cited by examiner

*Primary Examiner*—Wendy R. Garber
*Assistant Examiner*—Rashawn N. Tillery
(74) *Attorney, Agent, or Firm*—Sidley Austin Brown & Wood LLP

(57) ABSTRACT

In an electronic still camera in which the photoelectric conversion time, the photoelectric conversion output gain and the white balance setting are adjusted based on the previous photoelectric conversion output, flash light is emitted to assist distance measurement and pre-emission is performed for red eye reduction in flash photographing; the photoelectric conversion output is not used for the adjustment of the photoelectric conversion time, the photoelectric conversion output gain and the white balance setting or photoelectric conversion is not performed while the auxiliary light is being emitted. Alternatively, the auxiliary light is not emitted while photoelectric conversion is being performed.

31 Claims, 13 Drawing Sheets

ELECTRONIC STILL CAMERA WITH FEEDBACK CONTROL

This application is based on application No. H09-129188 filed in Japan, the content of which is hereby incorporated by reference.

BACKGROUND OF THE INVENTION

1. Field of the Invention

The present invention relates to an electronic still camera, and more specifically, to an electronic still camera which performs feedback control of image taking based on taken images.

2. Description of the Prior Art

In electronic still cameras, photographing is performed by directing light from a subject to a photoelectrically converting device (e.g., CCD) and processing an output signal of the photoelectrically converting device to generate image signals. Photographing is repeatedly performed and, therefore, a plurality of images are sequentially generated. When an instruction to perform recording is provided, the image taken at the instruction is recorded onto a recording medium such as a flash memory or a memory card.

The brightness of the images depends not only on the brightness of the subject but also on the exposure settings of the camera including the time of the photoelectric conversion and the output gain of the photoelectrically converting device. Therefore, in order to make the image brightness appropriate, it is necessary to adjust the exposure settings.

The hue of the images depends not only on the essential color of the subject but also on the color temperature of the external light illuminating the subject. For example, even if the color of the subject is pure white, a reddish image is obtained in photographing performed under tungsten light and a bluish image is obtained in photographing performed outdoors in cloudy weather. Consequently, in order to faithfully reproduce the color of the subject, white balance, namely the mixture ratio among red, green and blue (R, G and B) outputs from the photoelectrically converting device, is adjusted in processing the output signal of the photoelectrically converting device.

In a conventional electronic still camera, parameters for adjusting color of a taken image such as the photoelectric conversion time, the output gain and the white balance adjustment value associated with the processing from exposure of the CCD to the generation of image signals are set based on results of the previous photographing. Since photographing is repeated in a short cycle of approximately 1/15 second, it never occurs that the environmental brightness and the light source are greatly changed in one cycle of photographing. Accordingly, an image which is approximately color-adjusted with appropriate exposure is taken by such feedback control.

However, it frequently occurs that the light illuminating the subject changes significantly in a short time because of auxiliary light emitted by the camera. For example, in an electronic still camera designed to emit a small quantity of flashlight in advance in order to reduce a phenomenon that the eyes of the subject become red because of the flash light being reflected by the capillaries of the eyes, the quantity and the color temperature of the light emitted to the subject greatly differ between pre-emission period and non-pre-emission period.

Many electronic still cameras have an automatic focusing function and some of them are designed to emit auxiliary light to the subject in order to assist distance measurement in automatic focusing. The light environment changes significantly in a short time also by the emission of the auxiliary light for distance measurement.

When auxiliary light is emitted, since the light environment is changed in a short time as described above, appropriate parameters cannot be obtained by the feedback control in which parameters for exposure and image signal generation for the next photographing are set based on results of photographing. If photographing is performed by use of inappropriate parameters, the brightness and the hue of the taken images will naturally be inappropriate.

SUMMARY OF THE INVENTION

An object of the present invention is to provide an electronic still camera capable of taking images which are appropriately color-adjusted with appropriate exposure even when auxiliary light is emitted.

To achieve the above-mentioned object, according to the present invention, in an electronic still camera provided with a photographing unit which includes a photoelectric converter for receiving light of an object to be photographed and photoelectrically converting the light and processes a signal photoelectrically converted by the converter based on a preset parameter, an auxiliary light emitting unit for emitting auxiliary light to the object to be photographed, and parameter adjusting means which adjusts the parameter based on a signal processed by the photographing unit and sets an adjusted parameter to the photographing unit, the parameter adjusting means does not use for the parameter adjustment a signal outputted from the photoelectric converter during auxiliary light emission by the auxiliary light emitting unit.

Alternatively, the parameter adjusting means causes the photographing unit to stop signal output during auxiliary light emission by said auxiliary light emitting unit, or causes auxiliary light emission by the auxiliary light emitting unit to be stopped during parameter adjustment.

In normal photographing in which auxiliary light is not emitted to the object to be photographed, namely the subject, by adjusting the parameter used in the signal processing, appropriate images in accordance with environmental light are obtained. The output of the photoelectric converter produced while the auxiliary light is being emitted greatly differs from the output produced when the auxiliary light is not emitted.

However, the processing of the signal is never affected by the auxiliary light, since the output produced while the auxiliary light is being emitted is not used for the parameter adjustment, since the output is stopped while the auxiliary light is being emitted, or since auxiliary light is not emitted while parameter adjustment is being performed. As a result, photographing is always performed in accordance with environmental light irrespective of whether or not the auxiliary light is emitted.

The auxiliary light may be light emitted when the distance to the subject or the imaging condition of the light from the subject is detected in order to perform focusing for the subject, or may be light emitted prior to the emission of illuminating flash light in order to reduce the red eye phenomenon.

Examples of the parameter used in the signal processing include the time from start to end of the photoelectric conversion by the photoelectric converter, the output gain of the photoelectric converter and the ratio among the signals of different colors in performing color balance. The photoelectric conversion time and the output gain of the photoelectric converter are associated with the brightness of the images. The signal ratio in color balance is associated with the hue of the images. By adjusting these parameters based on the output of the photoelectric converter produced when the auxiliary light is not emitted, an image whose brightness and hue are appropriate can be obtained.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
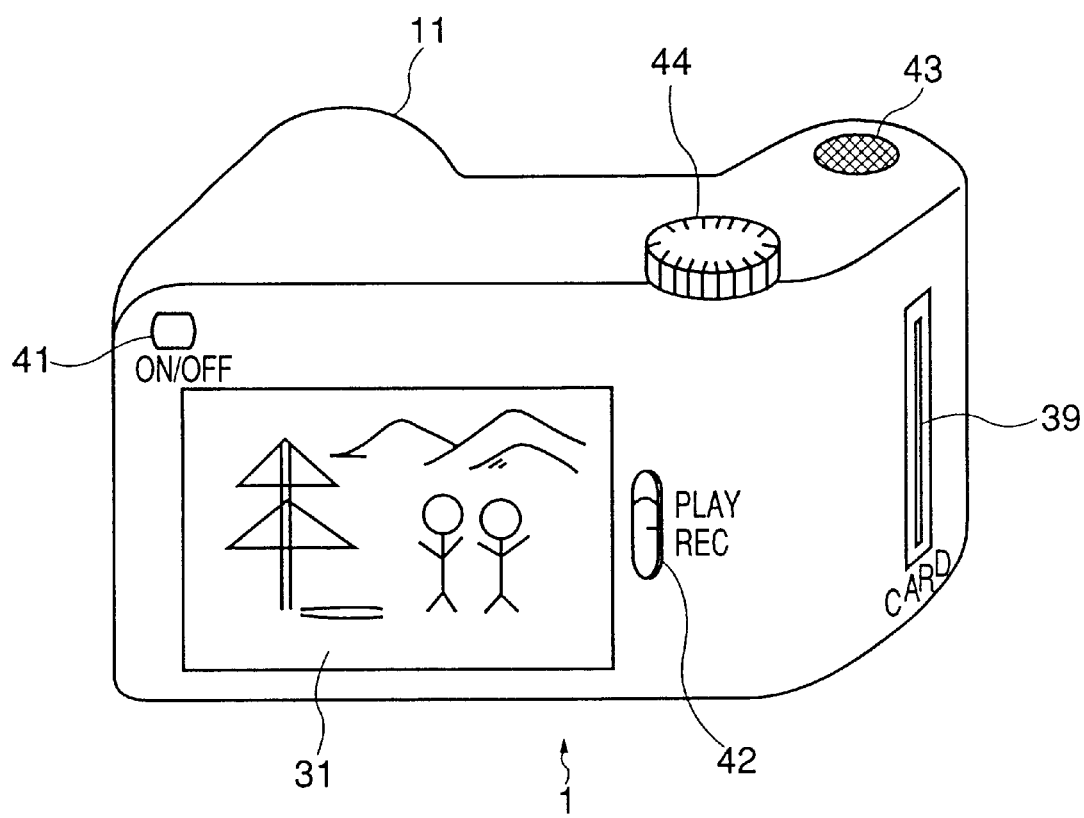
FIG. 1 is a perspective view showing the appearance of an electronic still camera according to an embodiment of the present invention.

Hereinafter, an embodiment of an electronic still camera employing the present invention will be described with reference to the drawings. FIG. 1 illustrates an electronic still camera 1 (hereinafter, sometimes referred to as camera) according to this embodiment obliquely viewed from above from the rear. The camera 1 has: a taking lens 11 on the front surface of the body; a large-size color liquid crystal display (LCD) 31, a main switch 41 and a photographing/reproduction changeover switch 42 on the back surface; a release button 43 and a photographing mode setting dial 44 on the top surface; and a card slot 39 on a side surface. Although not shown in the figure, a distance measurement window for measuring the distance to a subject, a flash light emission window for illuminating a subject, and a light adjustment window for receiving reflected light from a subject to adjust flash light emission are provided on the front surface of the body.

In the camera 1, light from a subject is imaged on a light receiving surface of a photoelectrically converting device (e.g., CCD) by the taking lens 11 and photographing is electronically performed by the CCD. The taken image is displayed on the LCD 31 and can be recorded on a detachably attached memory card inserted in the card slot 39 in response to an instruction to start recording. The instruction to start recording of a taken image is provided by operating the release button 43. At a first stroke (half depression) of the release button 43, an S1ON signal serving as an instruction to start distance measurement and photometry is generated, and at a second stroke (full depression), an S2ON signal serving as an instruction to perform image recording is generated.

When the photographing/reproduction changeover switch 42 is set at a position marked with "REC", the camera 1 is placed in a photographing mode in which photographing is performed by the CCD and the taken image is displayed on the LCD 31. The displayed image functions as the view finder for confirming framing and the, brightness of a subject.

The photographing mode includes the following four modes: a forcible flash mode in which flash light is forcibly emitted to a subject; a red eye reduction flash mode in which main flash light emission is performed after pre-emission performed several times; an automatic flash mode in which whether or not flash light is emitted is automatically determined; and a mode in which flash light is not emitted. Selection among these modes is made by the photographing mode setting dial 44.

The camera 1 has an automatic focusing function. The distance to a subject is measured and the focal point of the taking lens 11 is adjusted in accordance with the result of the distance measurement. When the subject is dark and distance measurement cannot be correctly performed, flash light is emitted to illuminate the subject and distance measurement is performed while the subject is being illuminated.

When the photographing/reproduction switch 42 is set at a position marked with "PLAY", the camera 1 is placed in a reproduction mode. In the reproduction mode, photographing is not performed and an image is retrieved from a memory card and displayed on the LCD 31. The displayed image is changed in response to the S2ON signal generated at the second stroke of the release button 43.

Figure 2:
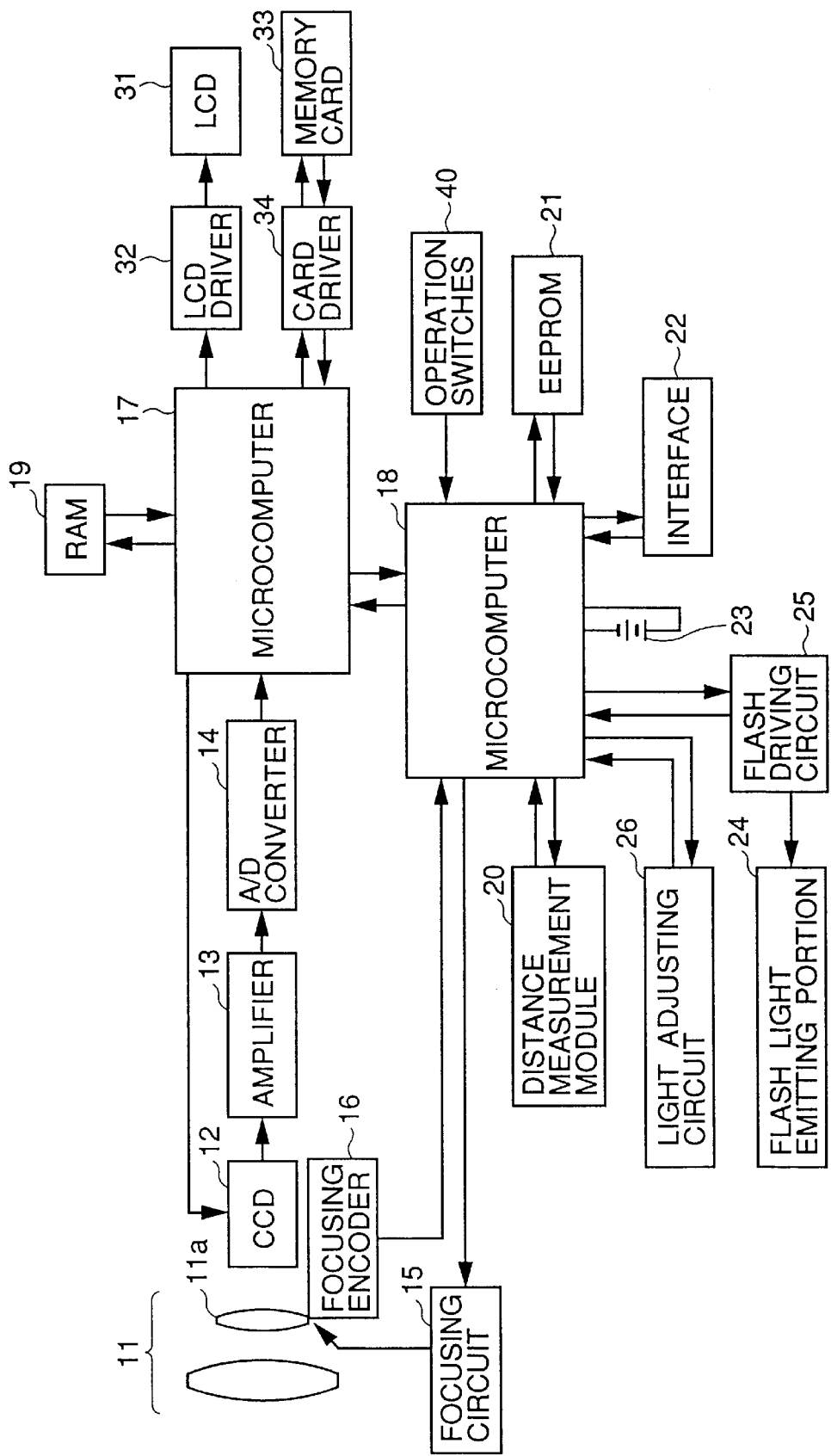
FIG. 2 is a block diagram schematically showing the configuration of the electronic still camera.

FIG. 2 schematically shows the configuration of the electronic still camera 1. The camera 1 has: the taking lens 11 constituting a taking optical system; a CCD 12 having three kinds of pixels that are alternately arranged and sensitive to red(R), green(G), and blue(B) light, respectively, for outputting an analog signal representative of the light reception amount of each pixel; an amplifier 13 for amplifying the output of the CCD 12; an analog-to-digital (A/D) converter 14 for converting an analog output of the amplifier 13 into a digital signal; and a microcomputer 17 for processing an output of the A/D converter 14 to generate image signals.

The taking lens 11 includes a movable lens unit 11a for focusing (hereinafter, referred to as a focusing lens). The taking lens 11 also includes a focusing circuit 15 for driving the focusing lens 11a and a focusing encoder 16 for detecting the movement of the focusing lens 11a.

The microcomputer 17 performs all the controls and processings associated with photographing and image signals. Specifically, the microcomputer 17 instructs the CCD 12 to start photoelectric conversion and to output charges accumulated through photoelectric conversion to thereby control photographing, provides the amplifier 13 with an amplification factor to thereby control gain, and performs processing such as γ conversion, white balance adjustment, interpolation among R, G and B and conversion to brightness/color-difference signal on a signal supplied from the A/D converter 14 to thereby generate image signals suitable for display. Photographing is performed in a cycle of $\frac{1}{15}$ second. The white balance adjustment may also be performed by adjusting amplifier 13 so that the amplification factors for the primary colors are adjusted independently.

The microcomputer 17 is connected to an LCD driver 32 for driving the LCD 31 and a card driver 34 for performing input/output for a memory card 33. Through the drivers 32 and 34, taken images are displayed on the LCD 31 and recorded on the memory card 33 in response to the user's instruction. It is possible to read out an image recorded on the memory card 33 and display it on the LCD 31. The microcomputer 17 is connected to a random access memory (RAM) 19 for temporarily storing a calculation result in signal processing.

In recording images on the memory card 33, the microcomputer 17 compresses image signals according to a method proposed by JPEG (joint photographic image coding experts group) in order to effectively use the storage capacity of the memory card 33. This compression reduces the amount of signals representative of one image to approximately a fraction of the original image, making it possible to record a multiplicity of images. When an image recorded on the memory card 33 is displayed on the LCD 31, the microcomputer 17 decompresses the image signals received from the memory card 33 to reproduce image signals suitably for display.

The memory card 33 is detachable. The camera 1 supplies images to an external printer or a personal computer through the memory card 33, allowing various processes, including printing, to be performed with an external apparatus. The programs for performing the above mentioned functions are stored in a read-only memory (ROM) provided in the microcomputer 17.

The camera 1 has a microcomputer 18 for controlling the camera 1 in its entirety. The microcomputer 18 is coupled to a distance measurement module 20 for detecting the distance to a subject, operation switches 40 including the release button 43, an electrically erasable programmable read-only memory (EEPROM) 21, an interface 22 for connection with an external apparatus, a battery 23, a flash light emitting portion 24, a flash driving circuit 25 for charging emission power and driving the emitting portion 24, and a light adjusting circuit 26 for outputting a signal serving as an instruction to stop flash light emission.

The battery 23 supplies power not only to the microcomputer 18, but also to other portions such as the microcomputer 17. An instruction to supply power is provided by the main switch 41. In order to conserve power, the camera 1 has the function of automatically disconnecting the power supply when no input operation is performed for a predetermined period of time. Preferably the microcomputer 18 provides an instruction to disconnect the power supply. The programs for performing the above mentioned functions are stored in a ROM provided in the microcomputer 18.

The light adjusting circuit 26 receives reflected light from the subject irradiated with flash light and outputs to the microcomputer 18 a light adjustment signal to provide an instruction to stop light emission when receiving a predetermined amount of light. Receiving the light adjustment signal, the microcomputer 18 instructs the flash driving circuit 25 to immediately stop light emission by the flash light emitting portion 24. Consequently, the brightness of the subject is appropriate irrespective of the distance to the subject. When photographing is performed in the red eye reduction flash mode, the microcomputer 18 causes the flash light emitting portion 24 to perform pre-emission several times.

The distance measurement module 20 detects the distance to a subject by the external light passive method and outputs to the microcomputer 18 a signal corresponding to the distance to the subject. The area used by the distance measurement module 20 for distance measurement is set substantially in the center of the photographic view angle of the CCD 12. According to the external light passive method, the distance to a subject cannot be detected when the subject is dark. When it is determined that distance measurement is impossible based on a signal from the distance measurement module 20, the microcomputer 18 instructs the flash driving circuit 25 to cause the flash light emitting portion 24 to emit light and the distance measurement module 20 performs distance measurement while flash light is being emitted.

In the EEPROM 21, factory-shipped adjustment values are stored and when the power supply is stopped, information on setting condition of each portion of the camera at that time is stored. The relationship between the output of the distance measurement module 20 and the subject distance is stored in the EEPROM 21 as a factory-shipped adjustment value.

The photoelectric conversion time of the CCD 12, the amplification factor of the amplifier 13 which decides the output gain of the CCD 12 and the initial value of the mixture ratio among R, G and B signals in the white balance adjustment are also stored in the EEPROM 21. The initial values of the photoelectric conversion time and the gain are $\frac{1}{60}$ second and one, respectively. The mixture ratio in the white balance adjustment is set to an initial value corresponding to the wavelength distribution of the flash light emitted by the flash light emitting portion 24. These values are supplied to the microcomputer 17 and used for exposure control and image signal generation.

The interface 22 is provided with terminals of various standards such as the RS-422C and the NTSC so that an external apparatus such as a printer, a personal computer and a television can be connected thereto. Consequently, it is possible for the camera 1 to transmit image signals to an external apparatus through the interface 22 without the use of the memory card 33. By connecting a large-capacity storage device as an external apparatus, it is possible to record a great number of images without changing the memory card 33. By connecting a television, taken images can be immediately displayed on the television. By connecting a personal computer, taken images can be arbitrarily processed with the personal computer and stored in the personal computer. It is also possible to control the camera 1 from an external apparatus through the interface 22.

The microcomputer 18 gives instructions to the microcomputer 17 in response to signals from the operation switches 40 to thereby control photographing, display and recording. Moreover, in accordance with subject distance information supplied from the distance measurement module 20, the microcomputer 18 drives the focusing circuit 15 to move the focusing lens 11a with reference to an output signal of the focusing encoder 16 to thereby focus light from the subject that is imaged on the light receiving surface of the CCD 12.

As described earlier, control of photoelectric conversion by the CCD 12 and image signal generation based on the output of the CCD 12 are performed by the microcomputer 17. Immediately after activation, the microcomputer 17 controls photoelectric conversion by the CCD 12 and amplification by the amplifier 13 by use of the initial values stored in the EEPROM 21 and performs the white balance adjustment in accordance with the initial value. After the first image is taken, the microcomputer 17 calculates the photoelectric conversion time and the value of the gain which make the brightness of the subject appropriate based on the value of a signal received from the A/D converter 14 in the photographing. Moreover, the microcomputer 17 calculates a white balance adjustment value which correctly reproduces the color of the subject based on the intensity distribution of the R, G and B signals in the photographing.

By use of the values calculated as described above, the next photographing is performed. Based on the result of that photographing, the photoelectric conversion time, the gain and the white balance adjustment value are calculated and by use of the calculated values, the next photographing is performed. Thereafter, this processing is repeated in a like manner. Thus, by performing feedback control, images of appropriate exposure and appropriate hue are taken as long as the quantity and the color temperature of the light illuminating the subject do not change abruptly.

However, when flash light is emitted to assist distance measurement or when pre-emission is performed in the red eye reduction flash mode, the quantity and the color temperature of the light illuminating the subject changes significantly momentarily. For this reason, an incorrect adjustment is made if the photoelectric conversion time, the gain and the white balance adjustment value are calculated based on the output of the CCD 12 produced while flash light emission or pre-emission is being performed. To avoid this problem, the electronic still camera 1, the calculation does not calculate the photoelectric conversion time, the gain and the white balance adjustment value based on the output of the CCD 12 during light emission when auxiliary light is emitted for distance measurement or red eye reduction. Rather, the values used in the previous photographing are used for the next photographing.

Hereinafter, operation controls of the camera 1 in photographing involving auxiliary light emission will be described in detail. Here, three control examples involving emission of flash light (hereinafter, referred to as AF auxiliary light) for assisting distance measurement and three control examples involving emission of flash light for red eye reduction will be shown.

Figure 3:
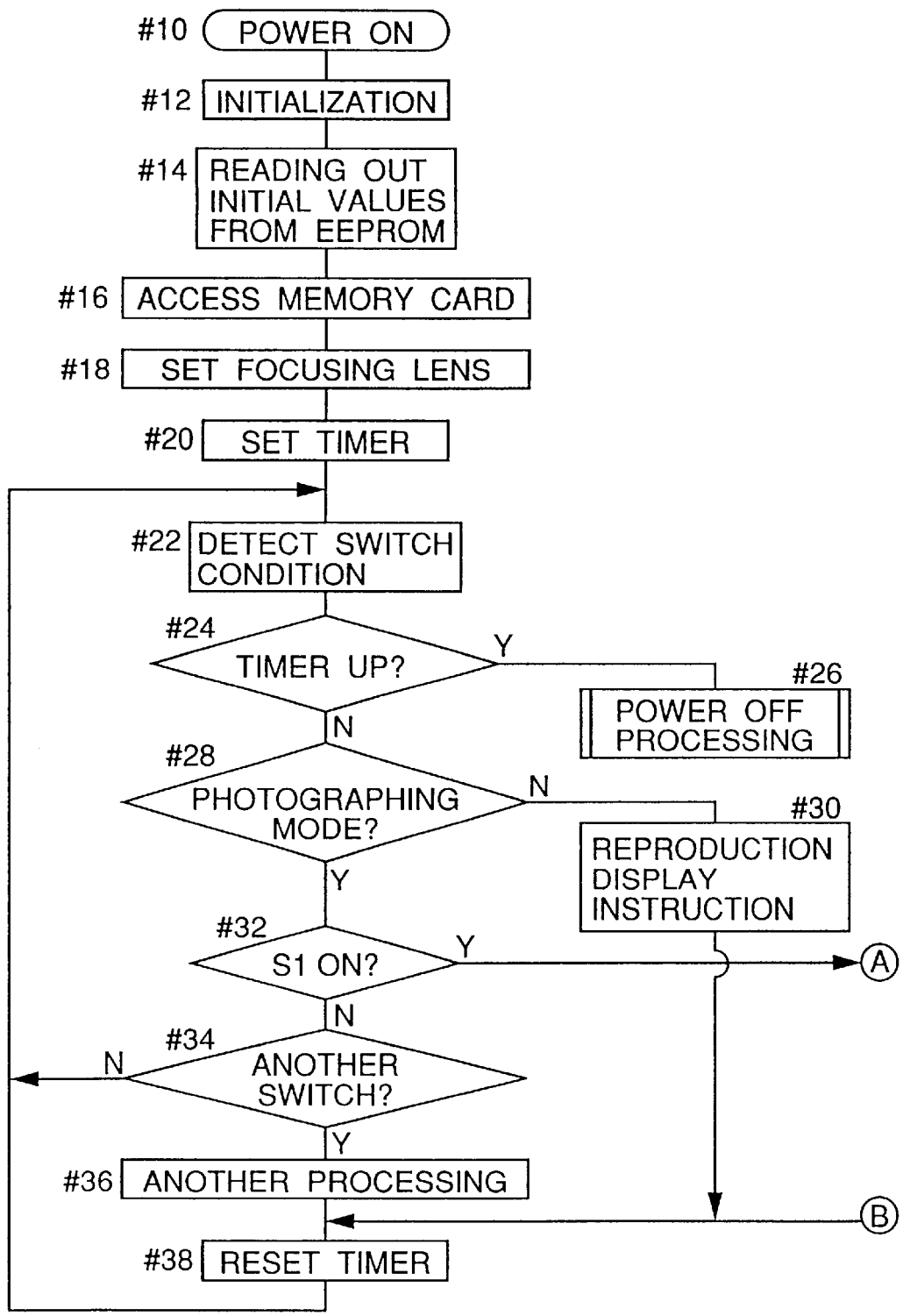
FIG. 3 is a flowchart of processing performed after activation by a microcomputer for controlling the electronic still camera in its entirety.

First, control processing performed by the microcomputer 18 immediately after activation common to the six control examples will be described with reference to the flowchart of FIG. 3. When the power supply is started by operating the main switch 41 (step #10), the microcomputer 18 is initialized (step #12). Then, the initial values associated with the photoelectric conversion time, the gain and the white balance and setting condition of each portion of the camera at the time of the previous stop of the power supply are retrieved from the EEPROM 21 (step #14). Thereafter, the portions of the camera are placed in the read-out setting.

Then, the memory card 33 is accessed through the card driver 34 (step #16) to retrieve information such as the kind, the total recording possible capacity and the recorded capacity of the memory card 33. Then, the focusing lens 11a is set at a position corresponding to a predetermined lens-to-subject distance (e.g. 3 m) (step #18). When the focusing lens 11a is set at this position, a wide area from a short distance to a long distance is included in the depth of field, so that the image which will be displayed on the LCD 31 later is sharp enough to function as the view finder.

The camera is now prepared for photographing. The microcomputer 18 periodically checks the condition of the operation switches 40 and performs processing in accordance with the condition. When no switch operation is performed for a predetermined period of time (preferably several minutes), the power supply is disconnected in order to conserve power. To measure the lapse of time, the microcomputer 18 initializes a timer at a predetermined value and starts the timer (step #20). Then, the microcomputer 18 starts processing in accordance with the operation of the switches.

First, the output of the operation switches 40 is checked (step #22). Then, it is determined whether or not the timer has reached the predetermined value (step #24). When the timer has reached the predetermined value, processing to disconnect the power supply is performed (step #26). Disconnecting the power supply places the camera in a sleep state. When the main switch 41 is operated to connect the power supply, the processing from step #12 is performed.

When the timer has not reached the predetermined value, it is determined whether the camera 1 is in the photographing mode or in the reproduction mode based on the setting condition of the photographing/reproduction changeover switch 42 (step #28). When the camera 1 is in the reproduction mode, the microcomputer 18 instructs the microcomputer 17 to perform reproduction processing including retrieving an image from the memory card 33 and displaying the image on the LCD 31 (step #30). After one image is reproduced, the process of the microcomputer 18 proceeds to step #38.

While no detailed description will be given as to the processing of the microcomputer 17 corresponding to the instruction given at step #30 because reproduction of recorded images has no direct relation to the present invention, the microcomputer 17 retrieves one image from the memory card 33 and displays the image on the LCD 31 every time an image reproduction instruction is provided. In the reproduction processing corresponding to the instruction given at step #30, the microcomputer 17 changes the displayed image based on the S2ON signal generated at the second stroke of the release button 43. Alternatively, the microcomputer 17 changes the reproduction image in accordance with a non-illustrated frame-advance switch. In the reproduction mode, image taking by the CCD 12 is not performed.

When the camera 1 is in the photographing mode in the determination at step #28, it is determined whether or not the S1ON signal generated at the first stroke of the release button 43 is present or absent (step #32). When the S1ON signal is absent, it is determined whether or not other switches are operated (step #34). When there is no switch operation, the process returns to step #22. When there is a switch operation, processing is performed in accordance with the switch operation (step #36). The processing performed at step #36 includes, for example, switching among the photographing modes. After the processing at step #36 is performed, the timer is initialized to the predetermined value and started (step #38). Then, the process returns to step #22.

When the S1ON signal is present in the determination at step #32, photographing is performed. While the processing performed in photographing differs among the control examples, in all the control examples, the process returns to step #38 after photographing is performed and the processing from step #22 is repeated. In photographing, the microcomputer 18 controls the camera 1 in its entirety, and the microcomputer 17 controls and processes functions associated with photographing supply some signals to each other to proceed processing. In all of the control examples, the microcomputer 17, the CCD 12 and the amplifier 13 do not operate and are in a sleep state to conserve power while the release button 43 is not operated, and start to operate in response to an instruction received from the microcomputer 18.

Figure 4:
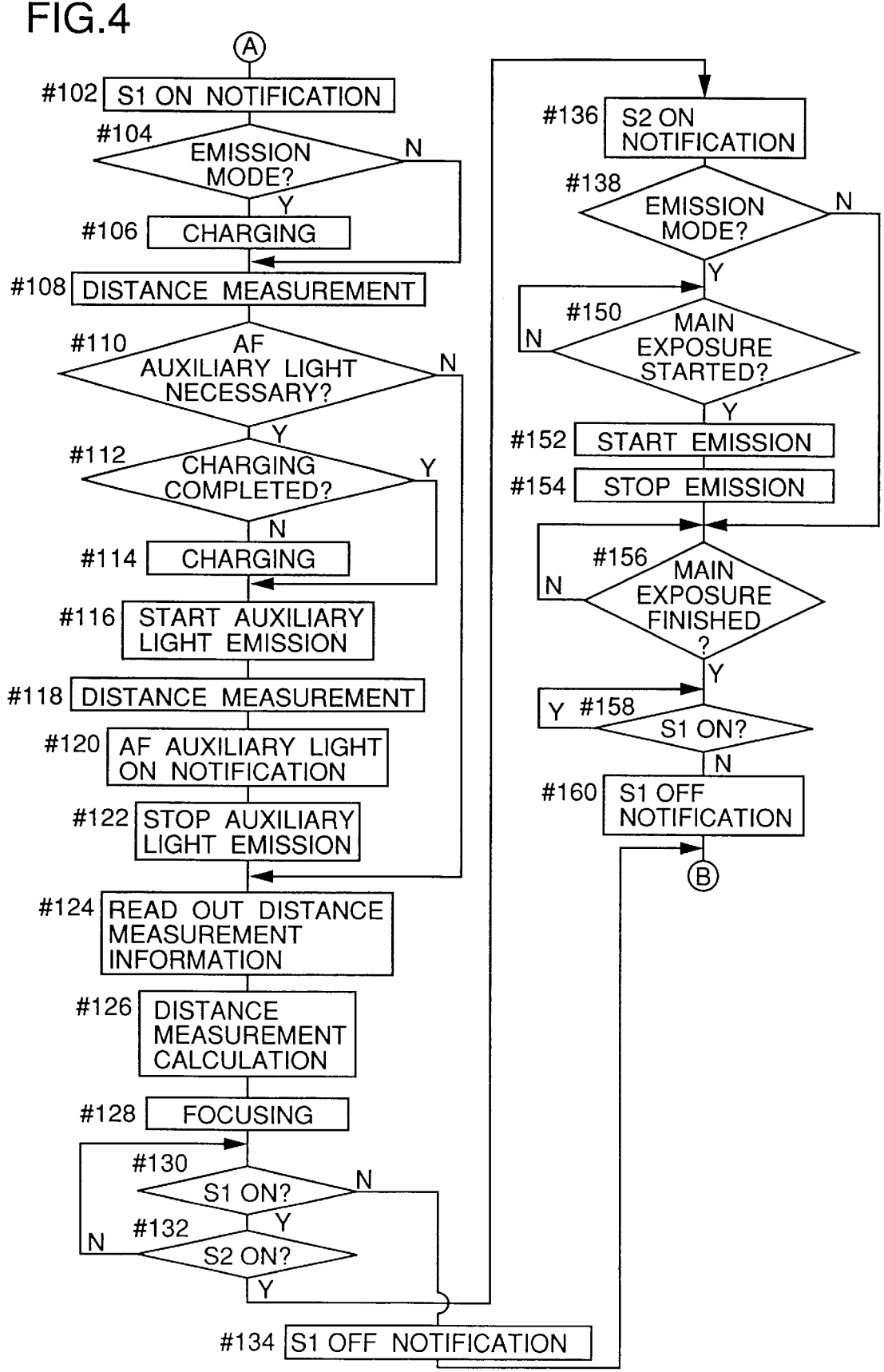
FIG. 4 is a flowchart of processing performed by the microcomputer for controlling the electronic still camera in its entirety in first and second control examples involving AF auxiliary light emission.

First, a first control example involving emission of the AF auxiliary light will be described. FIG. 4 shows the flow of processing of the microcomputer 18 in this control example continued from A of FIG. 3, when the S1ON signal is present in the determination at step #32 of FIG. 3, the microcomputer 18 supplies the microcomputer 17 with a signal representing that the S1ON signal is present (hereinafter, this signal will be referred to as S1ON notification signal) (step #102). The S1ON notification signal serves as an instruction to prepare for the main photographing by the CCD 12. Then, the microcomputer 18 determines whether or not the camera 1 is in a mode involving flash light emission (step #104). When the camera 1 is in a mode involving flash light emission, the microcomputer 18 provides the flash driving circuit 25 with an instruction to perform charging to prepare for light emission (step #106).

Then, distance measurement by the distance measurement module 20 is started (step #108), and from the output of the distance measurement module 20, it is determined whether or not emission of flash light as the AF auxiliary light is necessary (step #110). When the AF auxiliary light is necessary, it is determined whether or not a necessary quantity for the AF auxiliary light has been charged and charging is performed as necessary (steps #112 and #114). Then, the flash light emitting portion 24 is caused to emit flash light (step #116). Simultaneously therewith, distance measurement is repeated (step #118) and a signal representing emission of the AF auxiliary light (hereinafter, this signal will be referred to as AF auxiliary light ON notification signal) is continuously supplied to the microcomputer 17 while the flash light is being emitted (step #120). After the start of the emission, the flash light emission is stopped when the quantity of light emitted is sufficient for the distance measurement module 20 to correctly detect the distance to the subject, and the supply of the AF auxiliary light ON notification signal is stopped (step #122).

Then, distance measurement information is retrieved from the distance measurement module 20 (step #124) to calculate the distance to the subject. Then, the amount by which the focusing lens 11a is to be moved is calculated based on the subject distance (step #126) and the focusing lens 11a is moved by the calculated amount to perform focusing (step #128).

After focusing is performed, it is determined whether or not to continue the generation of the S1ON signal (step #130). When the S1ON signal is present, it is determined whether or not the S2ON signal generated at the second stroke of the release button 43 is present (step #132). When the S2ON signal is absent, the process returns to step #130. When the S1ON signal is absent in the determination at step #130, a signal representing that the generation of the S1ON signal is stopped (hereinafter, this signal will be referred to as S1OFF notification signal) is supplied to the microcomputer 17 (step #134). Then, the timer is reset at step #38 of FIG. 3 and the process returns to step #22. By the process proceeding from step #130 by way of step #134 to step #38, only focusing is performed without the taken image being recorded on the memory card 33.

When the S2ON signal is present in the determination at step #132, a signal representing that the S2ON signal is generated (hereinafter, this signal will be referred to as S2ON notification signal) is supplied to the microcomputer 17 (step #136). The S2ON notification signal serves as an instruction to perform main exposure involving the recording of taken images on the memory card 33. Then, it is determined whether or not the camera 1 is in a mode involving flash light emission (step #138). When the camera 1 is not in a mode involving flash light emission, the process proceeds to step #156.

When the camera 1 is in a mode involving flash light emission, the process waits until a signal representing the start of photoelectric conversion by the CCD 12 in response to the S2ON notification signal (hereinafter, this signal will be referred to as main exposure start notification signal) is supplied from the microcomputer 17 (step #150), and the flash light emitting portion 24 emits flash light (step #152). During the emission, the output of the light adjusting circuit 26 is monitored and the flash light emission is stopped when a light adjustment signal is generated (step #154).

Then, the process waits until a signal representing completion of the photoelectric conversion performed by the CCD 12 in response to the S2ON notification signal (hereinafter, this signal will be referred to as main exposure end notification signal) is supplied from the microcomputer 17 (step #156). Then, the process waits until the generation of the S1ON signal is stopped (step #158) and the S1OFF notification signal is supplied to the microcomputer 17 (step #160). Then, the timer is reset at step #38 of FIG. 3 and the process returns to step #22.

Figure 5:
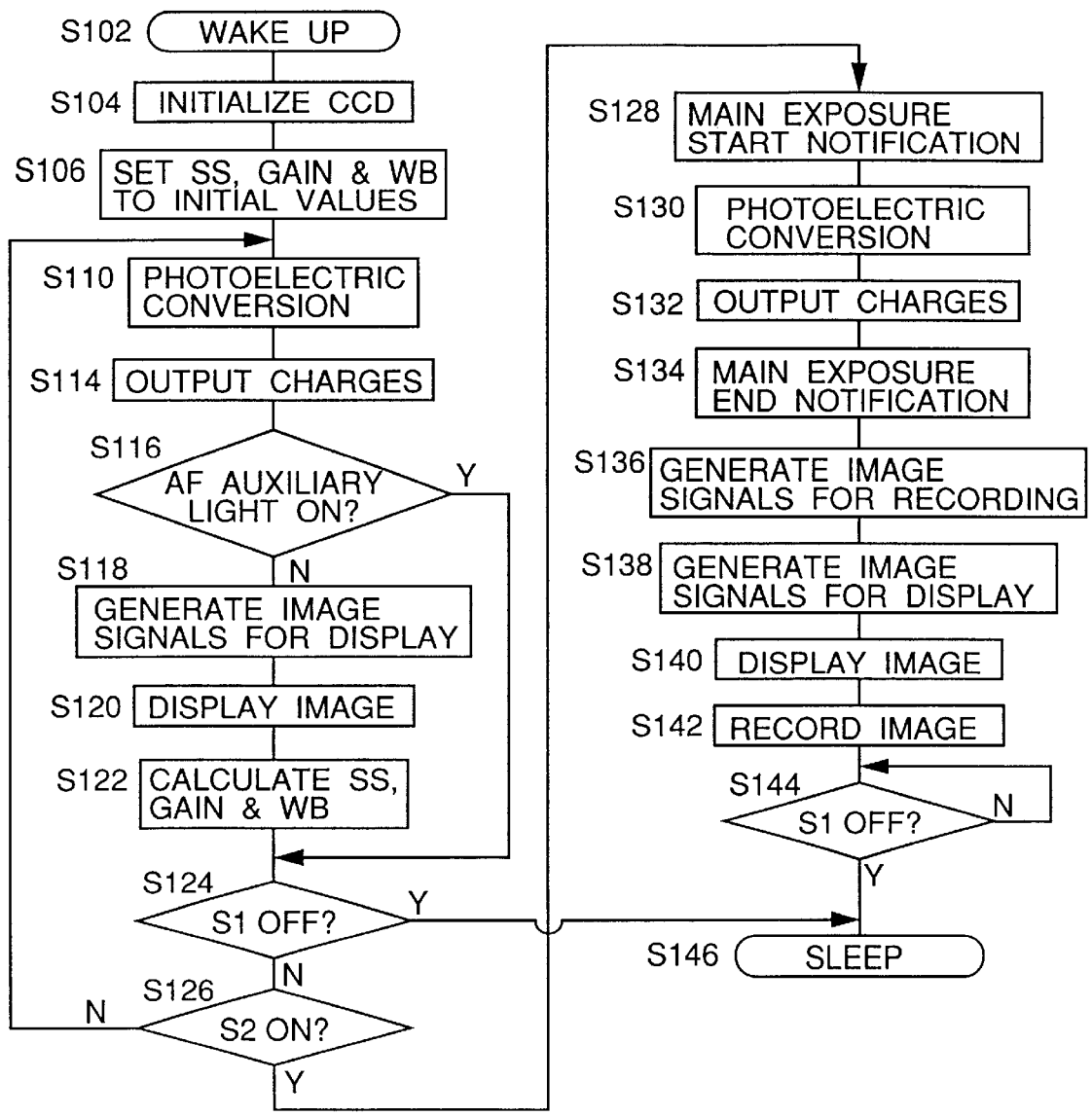
FIG. 5 is a flowchart showing processing performed by a microcomputer for controlling photographing of the electronic still camera in the first control example involving AF auxiliary light emission.

FIG. 5 shows the flow of processing of the microcomputer 17 in this control example. The microcomputer 17 starts to operate in response to the S1ON notification signal supplied from the microcomputer 18 at step #102 of FIG. 4 (step S102) and activates the CCD 12 and the amplifier 13. After the activation, the microcomputer 17 continuously monitors signals such as the AF auxiliary light ON notification signal and the S2ON notification signal supplied from the microcomputer 18 and performs processing in accordance with the supplied signal.

First, the charges accumulated in the CCD 12 are discharged so that the camera 1 is placed in photographable state (step S104) and the photoelectric conversion time, namely a shutter speed SS, the gain, namely the amplification factor of the amplifier 13, and the white balance (WB) adjustment value are set to the initial values stored in the EEPROM 21 (step S106).

Then, an instruction is given to the CCD 12 to start photoelectric conversion (step S110) and the accumulated charges are outputted from the CCD 12 when a set period of time has elapsed (step S114). Then, based on the presence or absence of the AF auxiliary light ON notification signal generated at step #120 of FIG. 4, it is determined whether or not the AF auxiliary light is emitted during the time period from the start of the photoelectric conversion to the output of the accumulated charges (step S116). When the AF auxiliary light is emitted during the photoelectric conversion, the process proceeds to step S124.

When the AF auxiliary light is not emitted during the photoelectric conversion, image signals for display are generated by performing processing such as white balance adjustment on the output of the CCD 12 (step S118), and the image is displayed on the LCD 31 (step S120). Moreover, for the next photographing, the photoelectric conversion time and the gain for the subject to be appropriately exposed, and the white balance adjustment value for appropriate color reproduction are calculated from the output of the CCD 12 supplied (step S122).

Then, it is determined whether or not the S1OFF notification signal generated at step #134 of FIG. 4 is received (step S124). When the signal is received, the process proceeds to step S146, wherein the microcomputer 17 is placed in a sleep state in which no operation is performed. When the S1OFF notification signal is not received, it is determined whether or not the S2ON notification signal generated at step #136 of FIG. 4 is received (step S126). When the S2ON notification signal is not received, the process returns to step S110.

By repeating the processing from steps S110 to S126, images are continuously taken. During this period, the photoelectric conversion time, the gain and the white balance adjustment value are successively updated to the values obtained at step S122. However, the calculation of the values at step S122 is not performed when the AF auxiliary light is emitted during the photoelectric conversion. In that case, the values used in the previous photographing are maintained. Consequently, the flash light for assisting distance measurement does not affect the photoelectric conversion time, the gain and the white balance adjustment value.

The image displayed on the LCD 31, which functions as a view finder, is updated at step S120. The update of the displayed image at step S120 is not performed when the AF auxiliary light is emitted during the photoelectric conversion. In that case, the image being displayed is continuously displayed. Consequently, it never occurs that the view finder momentarily becomes extraordinarily bright.

When the S2ON notification signal serving as the instruction to start main exposure is received in the determination at step S126, the above-mentioned main exposure start notification signal is supplied to the microcomputer 18 (step S128) and an instruction is given to the CCD 12 to start photoelectric conversion (step S130). Then, the accumulated charges are outputted from the CCD 12 when the photoelectric conversion time which is set at that time has elapsed (step S132), and the main exposure end notification signal is supplied to the microcomputer 18 (step S134).

The output of the CCD 12 is amplified by the amplifier 13 in accordance with the gain which is set at that time, and inputted to the microcomputer 17 through the A/D converter 14. The microcomputer 17 performs white balance adjustment processing on the input by use of the value which is set at that time and further performs processing such as interpolation and compression to generate image signals for recording (step S136). Moreover, the microcomputer 17 generates image signals for display from a signal generated after the white balance adjustment is performed (step S138), displays the image on the LCD 31 (step S140) and records the images signals for recording on the memory card 33 (step S142).

Then, the process waits for the S1OFF notification signal generated at step #160 of FIG. 4 (step S144) and the microcomputer 17 is placed in sleep state (step S146). The same image is continuously displayed on the LCD 31 while the process is waiting for the S1OFF notification signal at step S144. This display serves as the after view representative of an image recorded on the memory card 33.

As described above, focusing and AF auxiliary light emission are controlled by the microcomputer 18 and photoelectric conversion and signal processing are controlled by the microcomputer 17. However, since the microcomputer 18 notifies the microcomputer 17 that the AF auxiliary light is being emitted with the AF auxiliary light ON notification signal, the microcomputer 17 can determine whether or not the AF auxiliary light is being emitted. Since the microcomputer 17 does not calculate the photoelectric conversion time, the gain and the white balance adjustment value when the AF auxiliary light is emitted during photoelectric conversion, it never occurs that the output of the CCD 12, which is momentarily changed by the AF auxiliary light, disturbs the exposure amount and the white balance setting. As a result, an image is always taken which is appropriately color-adjusted with appropriate exposure.

Figure 6:
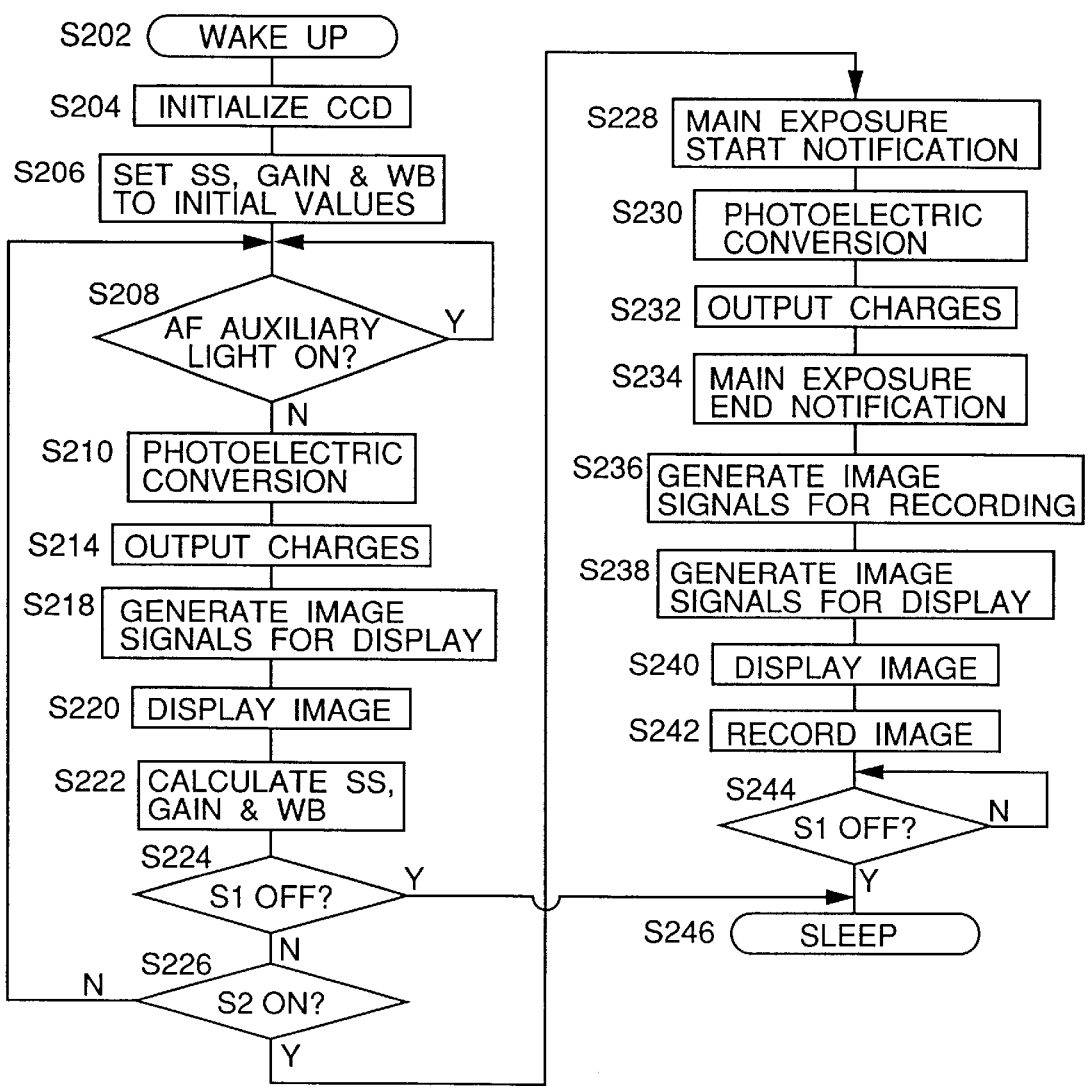
FIG. 6 is a flowchart showing processing performed by the microcomputer for controlling photographing of the electronic still camera in the second control example involving AF auxiliary light emission.

A second control example involving AF auxiliary light emission will be described. The processing of the microcomputer 18 in this control example is the same as that in the first control example and the processing of the microcomputer 17 is partly different. FIG. 6 shows the flow of processing of the microcomputer 17 in this control example. Here, differences from the first control example will be mainly described.

The processing from the start of operation of the microcomputer 17 in response to the S1ON notification signal (step S202) to the initial setting of the photoelectric conversion time, the gain and the white balance adjustment value (step S206) is the same as the processing from steps S102 to S106 of FIG. 5. After the initial setting, the microcomputer 17 determines whether or not the AF auxiliary light is being emitted based on the presence or absence of the AF auxiliary light ON notification signal generated at step #120 of FIG. 4. When the AF auxiliary light is being emitted, the process waits until the emission is stopped (step S208).

When the AF auxiliary light is not being emitted or after the emission of the AF auxiliary light is stopped, an instruction is given to the CCD 12 to start photoelectric conversion (step S210) and the accumulated charges are outputted from the CCD 12 after a set period of time has elapsed (step S214). Then, image signals for display are generated by performing processing such as white balance adjustment on the output of the CCD 12 (step S218), and the image is displayed on the LCD 31 (step S220). Moreover, for the next photographing, the photoelectric conversion time, the gain and the white balance adjustment value are calculated from the output of the CCD 12 supplied (step S222).

Then, it is determined whether or not the S1OFF notification signal is received (step S224). When the S1OFF notification signal is received, the process proceeds to step S246. When the S1OFF notification signal is not received, it is determined whether or not the S2ON notification is received (step S226). When the S2ON notification signal is not received, the process returns to step S208 to confirm that the AF auxiliary light is not being emitted, and photographing, display of a taken image and the calculation of the photoelectric conversion time, etc. are repeated.

The processing of the main exposure (steps S228 to S246) performed when the S2ON notification signal is received is the same as the processing of steps S128 to S146 of FIG. 5. That is, photographing is performed by use of the photoelectric conversion time and the gain which are set at that time (steps S230 and S232) and white balance adjustment is performed based on the value which is set at that time to generate image signals for recording and image signals for display (steps S236 and S238). Then, after display and recording are performed (steps S240 and S242), the microcomputer 17 is placed in sleep state (step S246). At the time of start and end of the photoelectric conversion, the main exposure start notification signal and the main exposure end notification signal are supplied to the microcomputer 18 (steps S228 and S234).

In this control example, the microcomputer 17 does not cause the CCD 12 to discharge the charges accumulated through the photoelectric conversion and does not update the photoelectric conversion time, the gain and the white balance adjustment value while the microcomputer 18 is causing the AF auxiliary light to be emitted. Consequently, these values are never disturbed by the AF auxiliary light, so that an image is always taken which is appropriately color-adjusted with appropriate exposure.

Figure 7:
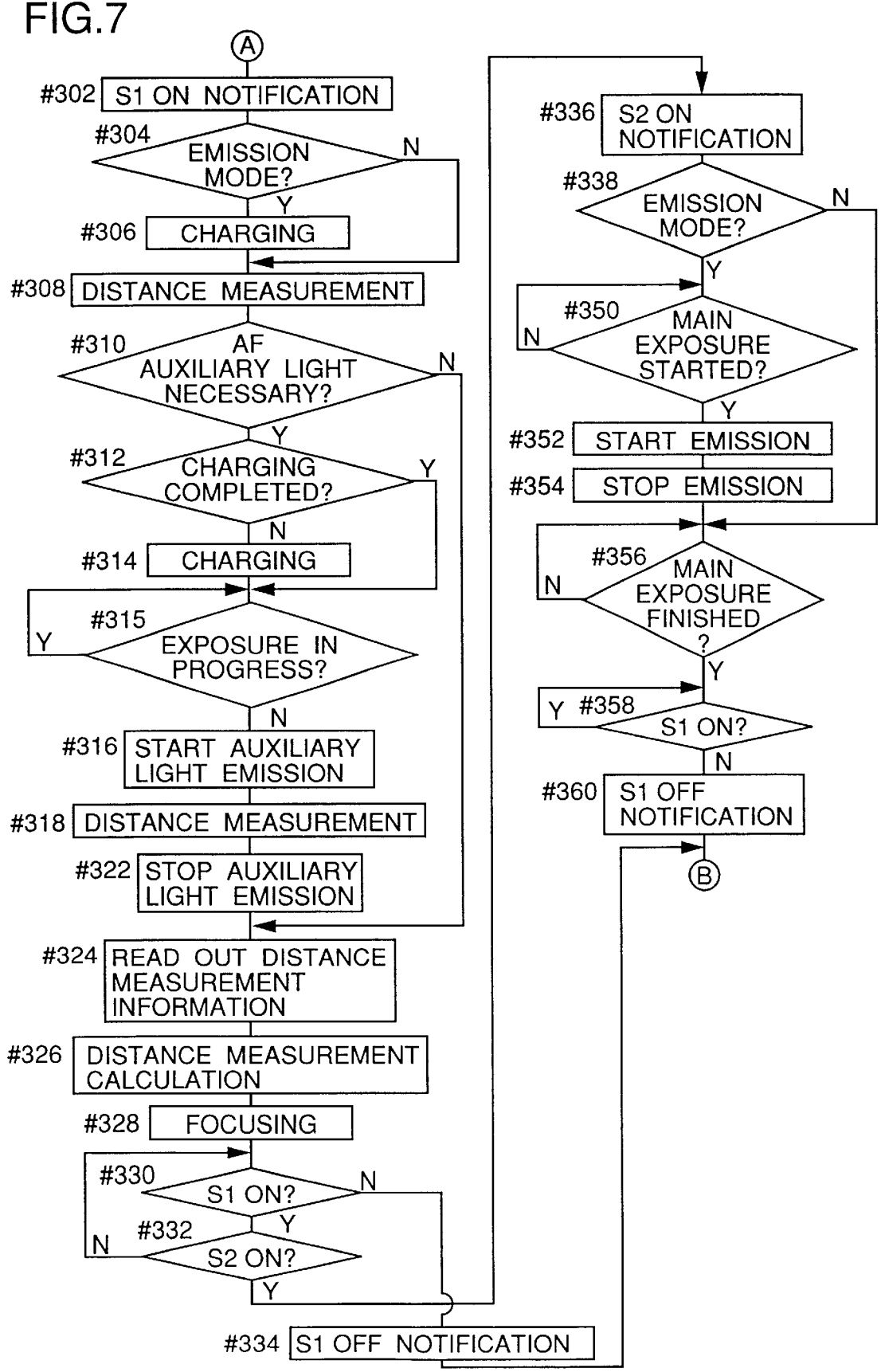
FIG. 7 is a flowchart of processing performed by the microcomputer for controlling the electronic still camera in its entirety in a third control example involving AF auxiliary light emission.
Figure 8:
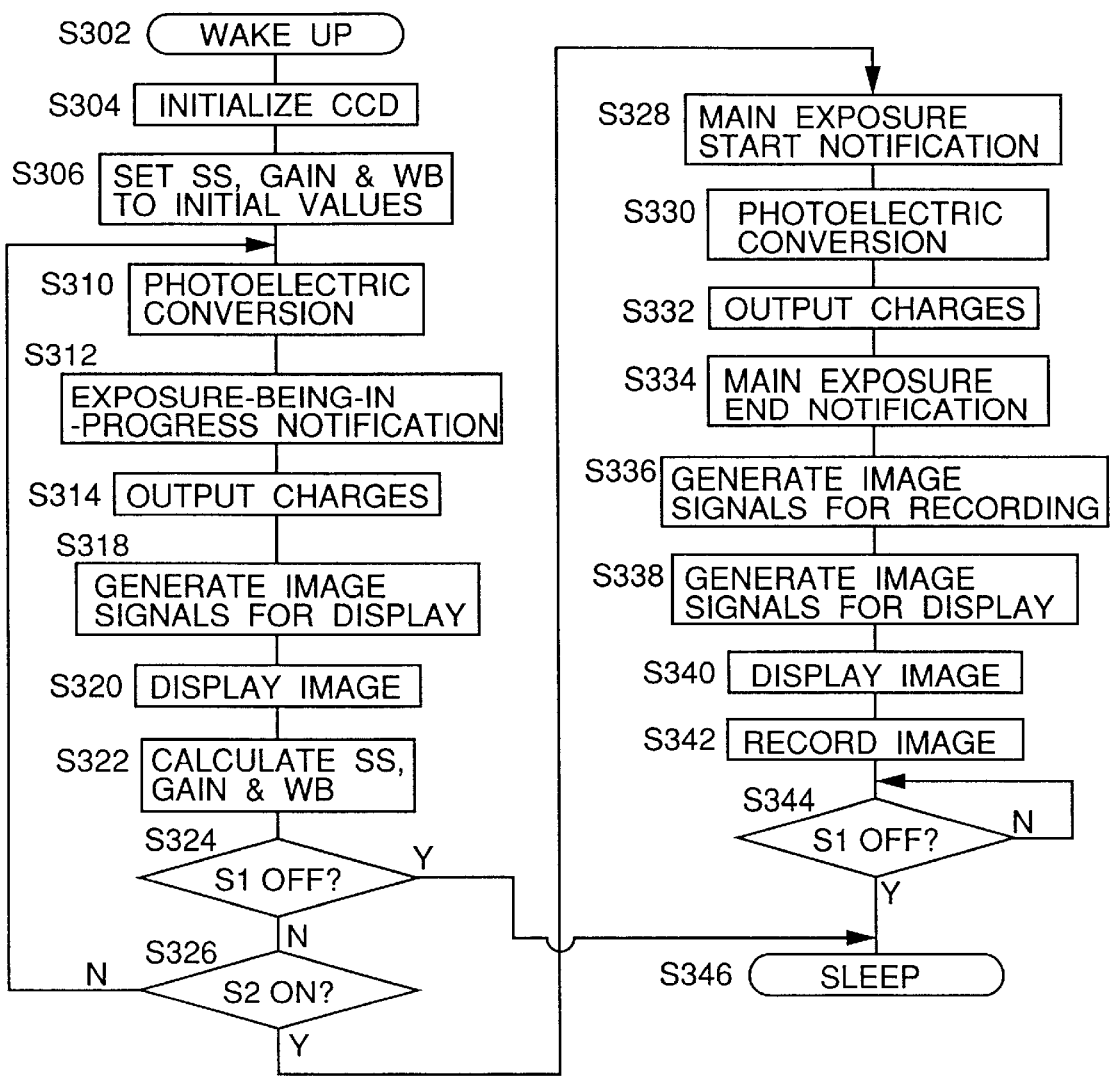
FIG. 8 is a flowchart showing processing performed by the microcomputer for controlling photographing of the electronic still camera in the third control example involving AF auxiliary light emission.

A third control example involving AF auxiliary light emission will be described. In this control example the processing of the microcomputer 18 and the processing of the microcomputer 17 are partly different from those of the first control example. FIGS. 7 and 8 show the flows of the processing of the microcomputer 18 and the processing of the microcomputer 17, respectively. Here, differences from the first control example will be mainly described.

The processing of the microcomputer 18 from the S1ON notification to the microcomputer 17 to the determination as to whether or not the AF auxiliary light is necessary (steps #302 to #310) is the same as the processing of steps #102 to #110 of FIG. 4 and will not be described. When the AF auxiliary light is necessary, the microcomputer 18 performs charging as necessary (steps #312 and #314) to prepare for auxiliary light emission. Then, based on a signal supplied from the microcomputer 17 representing that photoelectric conversion is being performed (hereinafter, this signal will be referred to as exposure-being-in-progress notification signal), it is determined whether or not photoelectric conversion by the CCD 12 is in progress. When photoelectric conversion is in progress, the process waits until it ends (step #315).

Then, the flash light emitting portion 24 is caused to emit light (step #316). Simultaneously therewith, distance measurement is performed (step #318). In this flow, the provision of the AF auxiliary light ON notification signal to the microcomputer 17 is not performed. After light emission is started, the flash light emission is stopped when the quantity of light emitted is enough for the distance measurement module 20 to correctly detect the distance to the subject (step #322).

The processing of the microcomputer 18 therefrom (steps #324 to #360) is the same as the processing of steps #124 to #160 of FIG. 4 and will not be described.

The processing from the start of operation of the microcomputer 17 to the initial setting of the photoelectric conversion time, the gain and the white balance adjustment value (steps S302 to S306 of FIG. 8) is the same as the processing of steps S102 to S106 of FIG. 5. After the initial setting, the microcomputer 17 provides the CCD 12 with an instruction to start photoelectric conversion (step S310) and supplies the microcomputer 18 with the above-mentioned exposure-being-in-progress notification signal representing that the CCD 12 is performing photoelectric conversion (step S312). When a set period of time has elapsed, the accumulated charges are outputted from the CCD 12 and the supply of the exposure-being-in-progress notification signal is stopped (step S314).

Then, image signals for display are generated by performing processing such as white balance adjustment on the output of the CCD 12 supplied via the A/D converter 14 after setting of the gain by the amplifier 13 (step S318), and the image is displayed on the LCD 31 (step S320). Moreover, for the next photographing, the photoelectric conversion time, the gain and the white balance adjustment values are calculated from the output of the CCD 12 (step S322).

Then, it is determined whether or not the S1OFF notification signal is received (step S324). When the S1OFF notification signal is received, the process proceeds to step S346. When the S1OFF notification signal is not received, it is determined whether or not the S2ON notification is received (S326). When the S2ON notification signal is not received, the process returns to step S310 to repeat photographing, display of a taken image and the calculation of the photoelectric conversion time, etc. The processing of the main exposure (steps S328 to S346) performed when the S2ON notification signal is received is the same as the processing of steps S128 and S146 of FIG. 5 and will not be described.

In this control example, the microcomputer 18 does not perform distance measurement involving AF auxiliary light emission while the microcomputer 17 is causing the CCD 12 to perform photoelectric conversion. Consequently, the photoelectric conversion time, the gain and the white balance adjustment value calculated by the microcomputer 17 are never disturbed by the AF auxiliary light, so that an image is always taken that is appropriately color-adjusted with appropriate exposure. It is to be noted that since the photoelectric conversion time is short, preferably not more than approximately 1/10 second, no problem is caused in photographing even though focusing waits until photoelectric conversion is finished.

Figure 9:
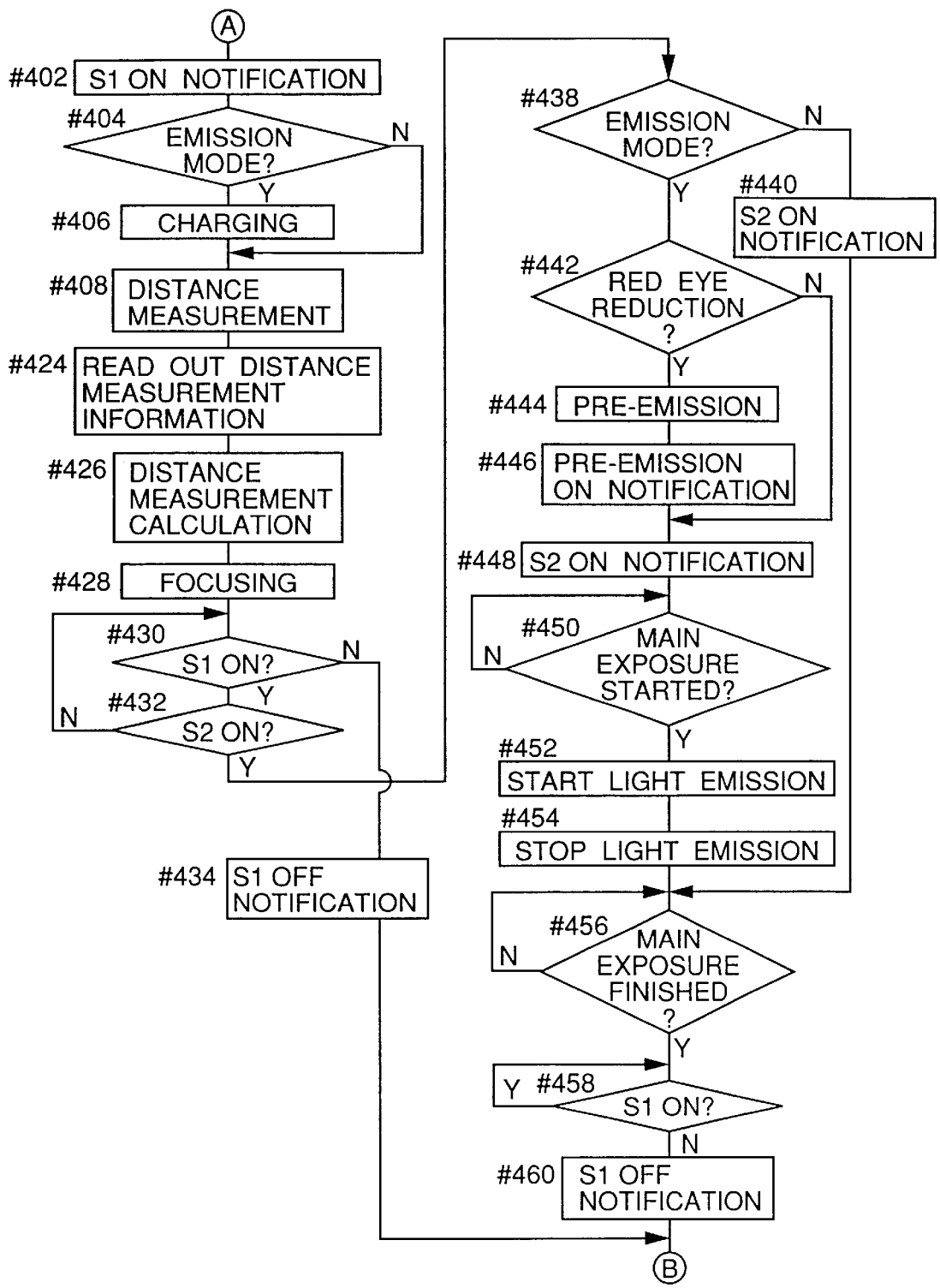
FIG. 9 is a flowchart showing processing performed by the microcomputer for controlling the electronic still camera in its entirety in first and second control examples involving pre-emission for red eye reduction.

A first control example involving flash light pre-emission for red eye reduction will be described. FIG. 9 shows the flow of processing of the microcomputer 18 continued from A of FIG. 3 in this control example. When the S1ON signal is present in the determination at step #32 of FIG. 3, the microcomputer 18 supplies the microcomputer 17 with the S1ON notification signal representing that the S1ON signal is present (step #402). Then, it is determined whether or not the camera 1 is in a mode involving flash light emission (step #404). When the camera 1 is in one of the modes involving flash light emission, the microcomputer 18 supplies the flash driving circuit 25 with an instruction to perform charging to prepare for light emission (step #406).

Then, distance measurement is started (step #408) and distance measurement information is retrieved from the distance measurement module 20 (step #424) to calculate the distance to the subject. Then, the amount by which the focusing lens 11a is to be moved is calculated based on the subject distance (step #426) and the focusing lens 11a is moved by the calculated amount to perform focusing (step #428).

After focusing is performed, it is determined whether or not the S1ON signal is continuously generated (step #430).

When the S1ON signal is present, it is determined whether the S2ON signal generated at the second stroke of the release button 43 is present or absent (step #432). When the S2ON.signal is absent, the process returns to step #430. When the S1ON signal is absent in the determination at step #430, the S1OFF notification signal representing that the generation of the S1ON signal is stopped is supplied to the microcomputer 17 (step #434). Then, the timer is reset at step #38 of FIG. 3 and the process returns to step #22.

When the S2ON signal is present in the determination at step #432, it is determined whether or not the camera 1 is in one of the modes involving flash light emission (step #438). When the camera 1 is not in a mode involving flash light emission, the S2ON notification signal representing that the generation of the S2ON signal is supplied to the microcomputer 17 (step #440), and the process proceeds to step #456. The S2ON notification signal serves as an instruction to perform main exposure involving the recording of taken images on the memory card 33.

When the camera 1 is in a mode involving flash light emission, it is determined whether or not it is the red eye reduction flash mode (step #442). When the camera 1 is not in the red eye reduction flash mode, the process proceeds to step #448. When the camera 1 is in the red eye.reduction flash mode, pre-emission is performed (step #444), and a signal representing that pre-emission is being performed (hereinafter, this signal will be referred to as pre-emission ON notification signal) is supplied to the microcomputer 17 while pre-emission is being performed (step #446). Pre-emission is performed several times in a cycle of approximately 2 Hz with a light quantity approximately a fraction of the light quantity of the main emission.

Then, the S2ON notification signal representing that the S2ON signal is generated is supplied to the microcomputer 17 (step #448). The process waits until the main exposure start notification signal representing that photoelectric conversion by the CCD 12 is started in response to the S2ON notification signal is supplied from the microcomputer 17 (step #450), and main exposure is performed for illuminating the subject so as to be bright (step #452). During emission, the output of the light adjusting circuit 26 is monitored and the flash emission is stopped when a light adjustment signal is emitted (step #454).

Then, the process waits until the main exposure end notification signal representing that the photoelectric conversion performed by the CCD 12 in response to the S2ON signal is finished is supplied to the microcomputer 17 (step #456). The process further waits until the generation of the S1ON signal is stopped (step #458) and the S1OFF notification signal is supplied to the microcomputer 17 (step #460). Then, the timer is reset at step #38 of FIG. 3 and the process returns to step #22.

Figure 10:
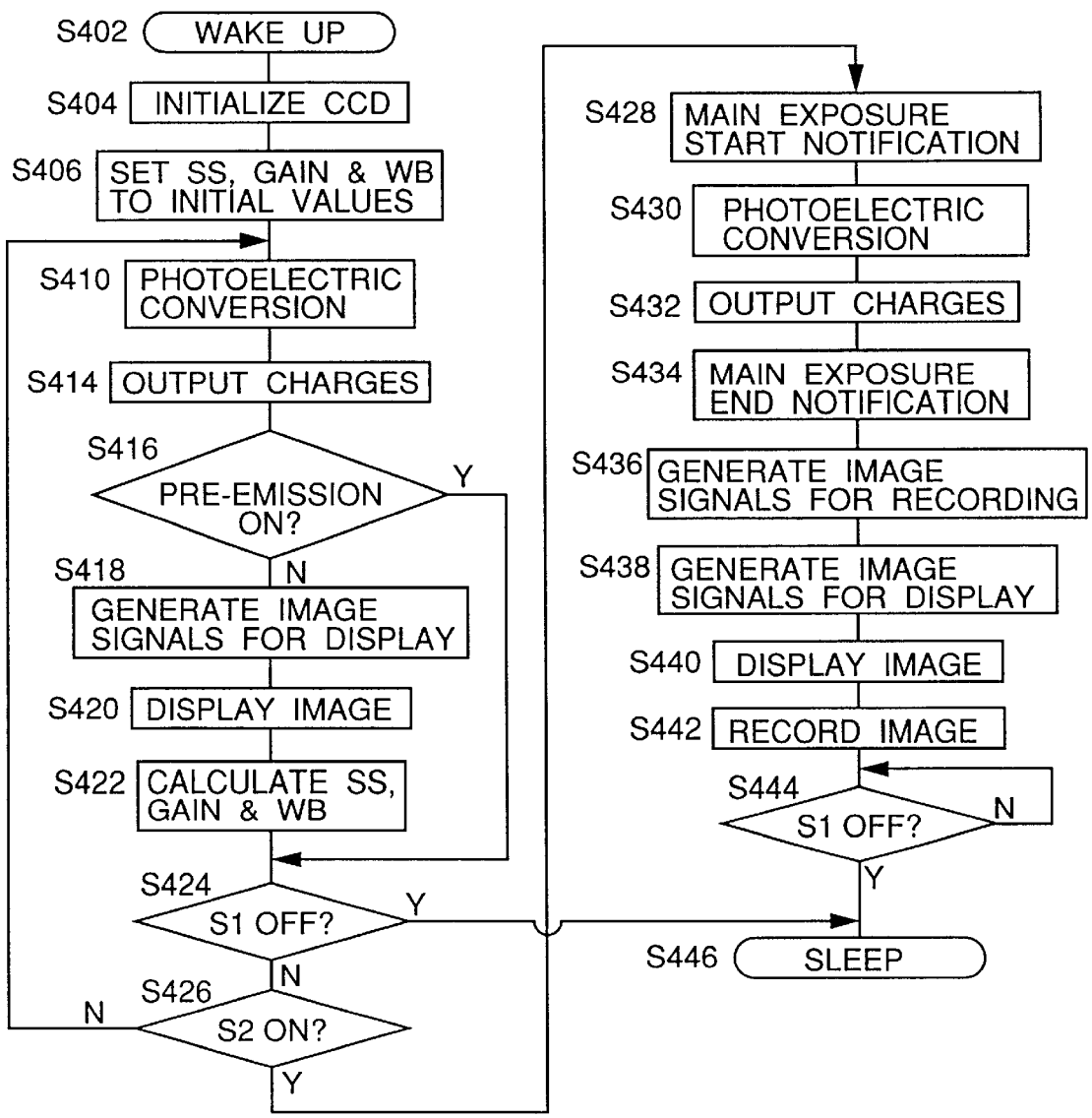
FIG. 10 is a flowchart showing processing performed by the microcomputer for controlling photographing of the electronic still camera in the first control example involving pre-emission for red eye reduction.

FIG. 10 shows the flow of processing of the microcomputer 17 in this control example. The microcomputer 17 stairs to operate in response to the S1ON notification signal supplied from the microcomputer 18 at step #402 of FIG. 9 (step S402) and activates the CCD 12 and the amplifier 13. After the activation, the microcomputer 17 continuously monitors signals such as the pre-emission ON notification signal and the S2ON notification signal supplied from the microcomputer 18 and performs processing in accordance with the supplied signal.

First, the charges accumulated in the CCD 12 is discharged so that the camera 1 is placed in photographable state (step S404) and the photoelectric conversion time, namely a shutter speed, the gain, namely the amplification factor of the amplifier 13, and the white balance adjustment value are set to the initial values stored in the EEPROM 21 (step S406).

Then, an instruction is given to the CCD 12 to start photoelectric conversion (step S410) and the accumulated charges are outputted from the CCD 12 when a set period of time has elapsed (step S414). Then, based on the presence or absence of the precession ON notification signal generated at step #446 of FIG. 9, it is determined whether or not pre-emission is performed during the time from the start of the photoelectric conversion to the output of the accumulated charges (step S416). When pre-emission is performed during the photoelectric conversion, the process proceeds to step S424.

When pre-emission is not performed during the photoelectric conversion, image signals for display are generated by performing processing such as white balance adjustment on the output of the CCD 12 supplied via the A/D converter 14 after setting of the gain by the amplifier 13 (step S418), and the image is displayed on the LCD 31 (step S420). Moreover, for the next photographing, the photoelectric conversion time and the gain for the subject to be appropriately exposed, and the white balance adjustment value for appropriate color reproduction are calculated from the output of the CCD 12 supplied (step S422).

Then, it is determined whether or not the S1OFF notification signal generated at step #434 of FIG. 9 is received (step S424). When the signal is received, the process proceeds to step S446, wherein the microcomputer 17 is placed in sleep state in which no operation is performed. When the S1OFF notification signal is not received, it is determined whether or not the S2ON notification signal generated at step #440 or #448 of FIG. 9 is received (step S426). When the S2ON notification signal is not received, the process returns to step S410.

By repeating the processing from steps S410 to S426, images are continuously taken. During this period, the photoelectric conversion time, the gain and the white balance adjustment value are successively updated to the values obtained at step S422. However, the calculation of the values at step S422 is not performed when the pre-emission is performed during the photoelectric conversion. In that case, the values used in the previous photographing are maintained. Consequently, the flash light for red eye reduction does not affect the photoelectric conversion time, the gain and the white balance adjustment value.

The image displayed on the LCD 31 is updated at step S420 and functions as the view finder. The update of the displayed image at step S420 is not performed when pre-emission is performed during the photoelectric conversion. In that case, the image being displayed is continuously displayed. Consequently, it never occurs that the view finder momentarily becomes extraordinarily bright.

When the S2ON notification signal serving as the instruction to start main exposure is received in the determination at step S426, the main exposure start notification signal is supplied to the microcomputer 18 (step S428), and an instruction is given to the CCD 12 to start photoelectric conversion (step S430). Then, the accumulated charges are outputted from the CCD 12 when the photoelectric conversion time which is set at that time has elapsed (step S432) and the main exposure end notification signal is supplied to the microcomputer 18 (step S434).

The output of the CCD 12 is amplified by the amplifier 13 in accordance with the gain which is set at that time, and inputted to the microcomputer 17 through the A/D converter 14. The microcomputer 17 performs white balance adjustment processing on the input by use of the value which is set at that time and further performs processing such as interpolation and compression to generate image signals for recording (step S436). Moreover, the microcomputer 17 generates image signals for display from a signal generated after the white balance adjustment is performed (step S438), displays the image on the LCD 31 (step S440) and records the images signals for recording on the memory card 33 (step S442).

Then, the process waits for the S1OFF notification signal generated at step #460 of FIG. 9 (step S444) and the microcomputer 17 is placed in sleep state (step S446). While the process is waiting for the S1OFF notification signal at step S444, an image recorded on the memory card 33 is displayed as the after view.

As described above, pre-emission and main emission of flash light are controlled by the microcomputer 18 and photoelectric conversion and signal processing are controlled by the microcomputer 17. However, since the microcomputer 18 notifies the microcomputer 17 that pre-emission is being performed with the pre-emission ON notification signal, the microcomputer 17 can determine whether or not pre-emission is being performed. Since the microcomputer 17 does not calculate the photoelectric conversion time, the gain and the white balance adjustment value when pre-emission is being performed during photoelectric conversion, it never occurs that the output of the CCD 12 which is momentarily changed by the pre-emission, disturbs the exposure amount and the white balance setting. As a result, an image is always taken which is appropriately color-adjusted with appropriate exposure.

Figure 11:
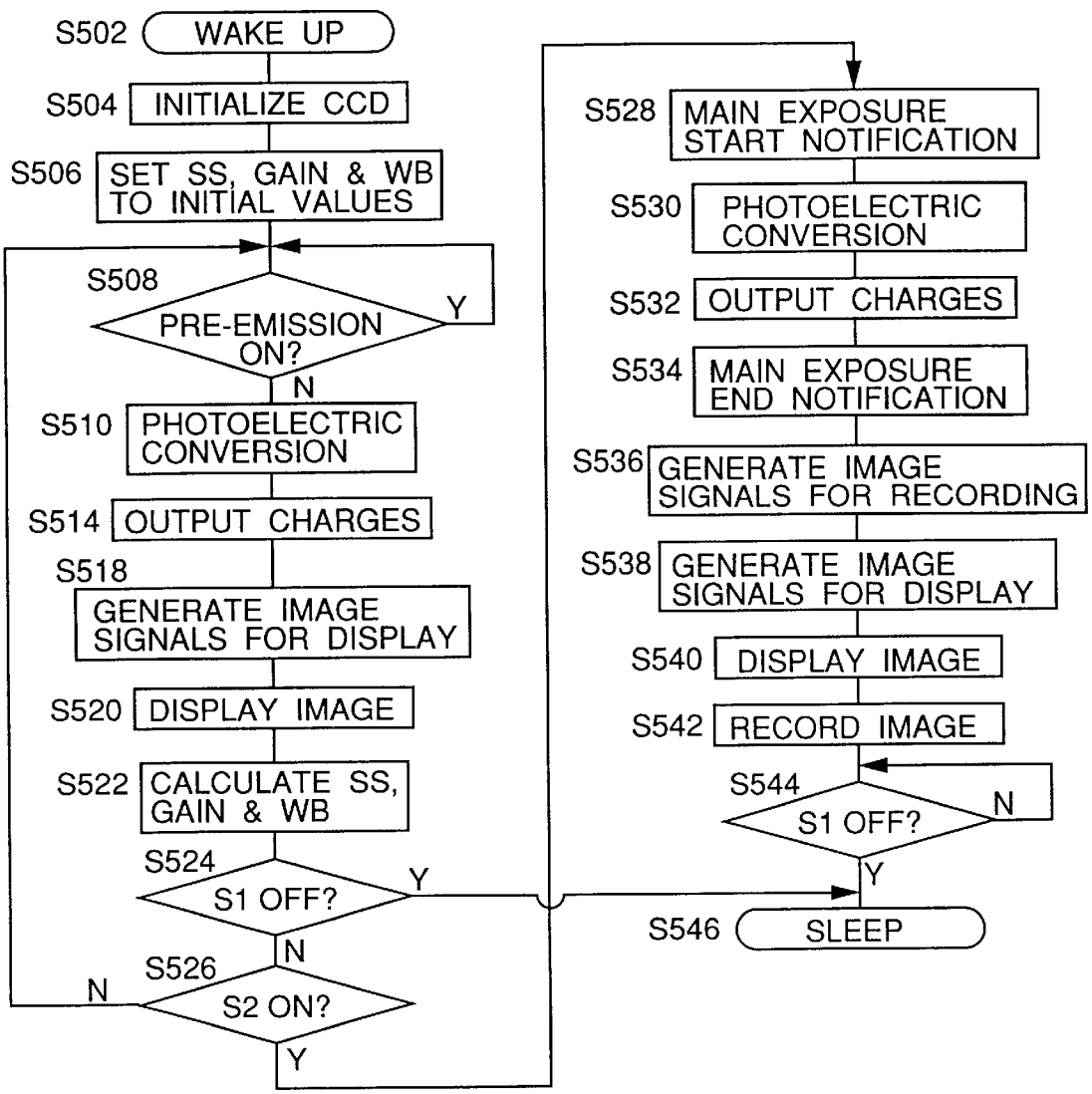
FIG. 11 is a flowchart showing processing performed by the microcomputer for controlling photographing of the electronic still camera in the second control example involving pre-emission for red eye reduction.

A second control example involving pre-emission will be described. The processing of the microcomputer 18 in this control example is the same as that in the first control example and the processing of the microcomputer 17 is partly different. FIG. 11 shows the flow of processing of the microcomputer 17 in this control example. Here, differences from the first control example will be mainly described.

The processing from the start of operation of the microcomputer 17 in response to the S1ON notification signal (step S502) to the initial setting of the photoelectric conversion time, the gain and the white balance adjustment value (step S506) is the same as the processing from step S402 to step S406 of FIG. 10. After the initial setting, the microcomputer 17 determines whether or not pre-emission is being performed based on the presence or absence of the pre-emission ON notification signal generated at step #446 of FIG. 9. When pre-emission is being performed, the process waits until the emission is stopped (step S508).

When pre-emission is not being performed or after pre-emission is stopped, an instruction is given to the CCD 12 to start photoelectric conversion (step S510) and the accumulated charges are outputted from the CCD 12 after a set period of time has elapsed (step S514). Then, image signals for display are generated by performing processing such as white balance adjustment on the output of the CCD 12 supplied via the A/D converter 14 after setting of the gain by the amplifier 13 (step S518), and the image is displayed on the LCD 31 (step S520). Moreover, for the next photographing, the photoelectric conversion time, the gain and the white balance adjustment value are calculated from the output of the CCD 12 supplied (step S522).

Then, it is determined whether or not the S1OFF notification signal is received (step S524). When the S1OFF notification signal is received, the process proceeds to step S546. When the S1OFF notification signal is not received, it is determined whether or not the S2ON notification is received (step S526). When the S2ON notification signal is not received, the process returns to step S508 to confirm that pre-emission is not being performed, and photographing, display of a taken image and the calculation of the photoelectric conversion time, etc. are repeated.

The processing of the main exposure (steps S528 to S546) performed upon receipt of the S2ON notification signal is the same as the processing of steps S428 to S446 of FIG. 10. That is, photographing is performed by use of the photoelectric conversion time and the gain which are set at that time (steps S530 and S532), and white balance adjustment is performed based on the value which is set at that time to generate image signals for recording and image signals for display (steps S536 and S538). Then, after display and recording are performed (steps S540 and S542), the microcomputer 17 is placed in sleep state (step S546). At the time of start and end of the photoelectric conversion, the main exposure start notification signal and the main exposure end notification signal are supplied to the microcomputer 18 (steps S528 and S534).

In this control example, while the microcomputer 18 is performing pre-emission, the microcomputer 17 does not cause the CCD 12 to discharge the charges accumulated through the photoelectric conversion and does not update the photoelectric conversion time, the gain and the white balance adjustment value. Consequently, these values are never disturbed by the pre-emission, so that an image is always taken which is appropriately color-adjusted with appropriate exposure.

Figure 12:
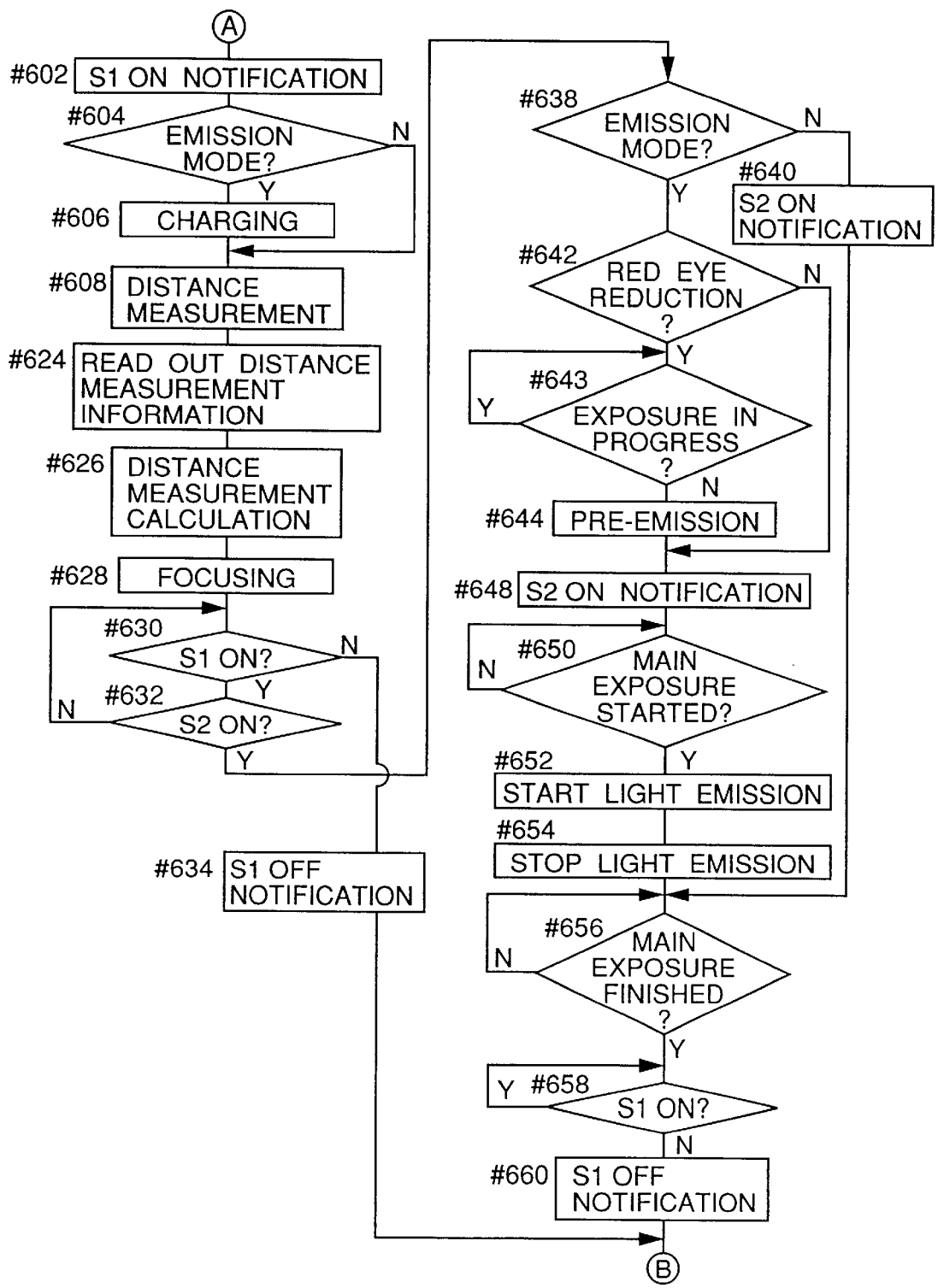
FIG. 12 is a flowchart showing processing performed by the microcomputer for controlling the electronic still camera in its entirety in a third control example involving pre-emission for red eye reduction.
Figure 13:
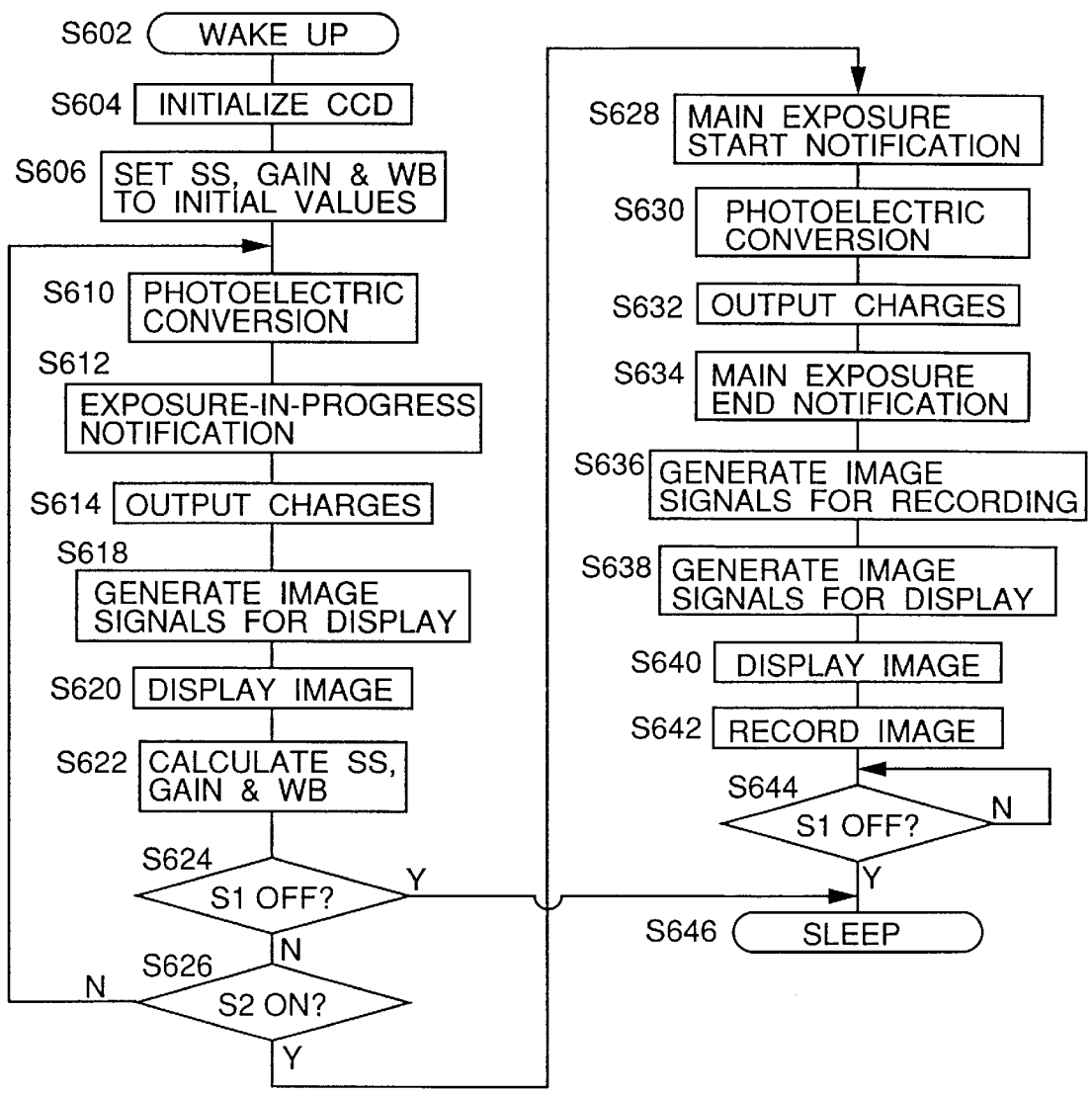
FIG. 13 is a flowchart showing processing performed by the microcomputer for controlling photographing of the electronic still camera in the third control example involving pre-emission for red eye reduction.

A third control example involving pre-emission will be described. In this control example, the processing of the microcomputer 18 and the processing of the microcomputer 17 are partly different from those of the first control example. FIGS. 12 and 13 show the flows of the processing of the microcomputer 18 and the processing of the microcomputer 17, respectively. Here, differences from the first control example will be described.

The processing of the microcomputer 18 from the S1ON notification to the microcomputer 17 to the determination as to whether or not the camera 1 is in the red eye reduction mode (steps #602 to #642) is the same as the processing of steps #402 to #442 of FIG. 9 and will not be described. Prior to the pre-emission, the microcomputer 18 determines whether or not photoelectric conversion by the CCD 12 is in progress based on the exposure-being-in-progress notification signal supplied from the microcomputer 17 representing that photoelectric conversion is being performed. When photoelectric conversion is in progress, the process waits until the photoelectric conversion is finished (step #643).

When photoelectric conversion is not being performed or after photoelectric conversion is finished, pre-emission is performed (step #644). In this flow, the provision of the pre-emission ON notification signal to the microcomputer 17 is not performed. Then, like steps #448 to #460 of FIG. 9, the exchange of the S2ON notification signal and the main exposure start notification signal with the microcomputer 17 is performed (steps #648 and #650), main emission is performed (steps #652 and #654), and the process waits for the main exposure end notification signal supplied from the microcomputer 17 (step #656). The process further waits until the generation of the S1ON notification signal is stopped (step #658) and the S1OFF notification signal is supplied to the microcomputer 17 (step #660). Then, the timer is reset at step #38 of FIG. 3 and the process returns to step #22.

The processing from the start of operation of the microcomputer 17 to the initial setting of the photoelectric conversion time, the gain and the white balance adjustment value (steps S602 to S606 of FIG. 13) is the same as the processing of steps S402 to S406 of FIG. 10. After the initial setting, the microcomputer 17 gives an instruction to the CCD 12 to start photoelectric conversion (step S610) and supplies the microcomputer 18 with the exposure-being-in-progress notification signal representing that the CCD 12 is performing photoelectric conversion (step S612). When the set time has elapsed, the CCD 12 is caused to output the accumulated charges and the supply of the exposure-being-in-progress notification signal is stopped (step S614).

Then, image signals for display are generated by performing processing such as white balance adjustment on the output of the CCD 12 supplied via the A/D converter 14 after setting of the gain by the amplifier 13 (step S618), and the image is displayed on the LCD 31 (step S620). Moreover, for the next photographing, the photoelectric conversion time, the gain and the white balance adjustment value are calculated from the output of the CCD 12 supplied (step 622).

Then, it is determined whether or not the S1OFF notification signal is received (step S624). When the signal is received, the process proceeds to step S646. When the S1OFF notification signal is not received, it is determined whether or not the S2ON notification signal is received (step S626). When the S2ON notification signal is not received, the process returns to step S610 to repeat photographing, display of a taken image and the calculation of the photoelectric conversion time, etc. The processing of main exposure (steps S628 to S646) performed upon receipt of the S2ON notification signal is the same as the processing of steps S428 to S446 of FIG. 10 and will not be described.

In this control example, the microcomputer 18 does not perform the pre-emission for red eye reduction while the microcomputer 17 is causing the CCD 12 to perform photoelectric conversion. Consequently, the photoelectric conversion time, the gain and the white balance adjustment value calculated by the microcomputer 17 are never disturbed by the pre-emission, so that an image is always taken which is appropriately color-adjusted with appropriate exposure.

As described above with respect to the six control examples, in the electronic still camera 1, by not performing the calculation of the photoelectric conversion time, the gain and the white balance adjustment value from the output of the CCD 12 while the auxiliary light for distance measurement is being emitted and the pre-emission for red eye reduction is being performed, or by causing the CCD 12 to produce no output while these auxiliary lights are being emitted, the photoelectric conversion time, the gain and the white balance adjustment value are not affected by the auxiliary lights. Alternatively, by not performing emission of the auxiliary light for distance measurement or pre-emission for red eye reduction while photoelectric conversion is being performed, the photoelectric conversion time, the gain and the white balance adjustment value are not affected by the auxiliary lights. As a result, in the electronic still camera 1, an image is taken which is appropriately color-adjusted with appropriate exposure.

While the control for emitting the AF auxiliary light and the control for performing pre-emission have been described as different examples for ease of explanation, the control for emitting the AF auxiliary light prior to focusing and the control for performing pre-emission prior to main flash emission can be performed simultaneously. This is easily realized by using in combination the AF auxiliary light ON notification signal, the pre-emission ON notification signal, the main exposure start notification signal, the main exposure end notification signal and the exposure-being-in-progress notification signal shown in the above-described examples.

Obviously, many modifications and variations of the present invention are possible in light of the above teachings. It is therefore to be understood that within the scope of the appended claims, the invention may be practiced other than as specifically described.

What is claimed is:

1. An electronic still camera comprising:
   a photographing unit including a photoelectric converter for receiving an image of an object to be photographed and photoelectrically converting the image, said photographing unit executing a predetermined process on the image received by said photoelectric converter based on a preset parameter and thus outputting a signal representing the image;
   an auxiliary light emitting unit for emitting auxiliary light to the object to be photographed; and
   parameter adjusting means for adjusting said parameter based on the signal outputted from said photographing unit, and setting the adjusted parameter to said photographing unit, said parameter adjusting means excluding from the parameter adjustment the signal outputted from said photographing unit during auxiliary light emission by said auxiliary light emitting unit.

2. An electronic still camera as claimed in claim 1, further comprising:
   a distance measurement unit for measuring a distance to the object to be photographed,
   wherein said auxiliary light is emitted at the time of distance measurement by said distance measurement unit.

3. An electronic still camera as claimed in claim 1,
   wherein said auxiliary light is emitted for red eye reduction.

4. An electronic still camera as claimed in claim 1,
   wherein said parameter is a time from start to end of photoelectric conversion by said photoelectric converter.

5. An electronic still camera as claimed in claim 1,
   wherein said parameter is a gain of said photoelectric converter.

6. An electronic still camera as claimed in claim 1,
   wherein said photoelectric converter is capable of outputting signals of a plurality of colors, and said parameter is a ratio among said signals of said colors in performing color balance.

7. An electronic still camera comprising:
   a photographing unit including a photoelectric converter for receiving an image of an object to be photographed and photoelectrically converting the image, said photographing unit executing a predetermined process on the image received by said photoelectric converter based on a preset parameter and thus outputting a signal representing the image;
   an auxiliary light emitting unit for emitting auxiliary light to the object to be photographed; and
   parameter adjusting means for adjusting said parameter based on the signal outputted from said photographing unit, and setting the adjusted parameter to said photographing unit, said parameter adjusting means causing said photographing unit not to output the signal during auxiliary light emission by said auxiliary light emitting unit.

8. An electronic still camera as claimed in claim 7, further comprising:

a distance measurement unit for measuring a distance to the object to be photographed, wherein said auxiliary light is emitted at the time of distance measurement by said distance measurement unit.

9. An electronic still camera as claimed in claim 7, wherein said auxiliary light is emitted for red eye reduction.

10. An electronic still camera as claimed in claim 7, wherein said parameter is a time from start to end of photoelectric conversion by said photoelectric converter.

11. An electronic still camera as claimed in claim 7, wherein said parameter is a gain of said photoelectric converter.

12. An electronic still camera as claimed in claim 7, wherein said photoelectric converter is capable of outputting signals of a plurality of colors, and said parameter is a ratio among said signals of said colors in performing color balance.

13. An electronic still camera comprising:

a photographing unit including a photoelectric converter for receiving an image of an object to be photographed and photoelectrically converting the image, said photographing unit executing a predetermined process on the image received by said photoelectric converter based on a preset parameter and thus outputting a signal representing the image;

an auxiliary light emitting unit for emitting auxiliary light to the object to be photographed; and parameter adjusting means for adjusting said parameter based on the signal outputted from said photographing unit, and setting the adjusted parameter to said photographing unit, said parameter adjusting means preventing output of the signal during auxiliary light emission by said auxiliary light emitting unit.

14. An electronic still camera as claimed in claim 13, a distance measurement unit for measuring a distance to the object to be photographed, wherein said auxiliary light is emitted at the time of distance measurement by said distance measurement unit.

15. An electronic still camera as claimed in claim 13, wherein said auxiliary light is emitted for red eye reduction.

16. An electronic still camera as claimed in claim 13, wherein said parameter is a time from start to end of photoelectric conversion by said photoelectric converter.

17. An electronic still camera as claimed in claim 13, wherein said parameter is a gain of said photoelectric converter.

18. An electronic still camera as claimed in claim 13, wherein said photoelectric converter is capable of outputting signals of a plurality of colors, and said parameter is a ratio among said signals of said colors in performing color balance.

19. An electronic still camera comprising:

a first unit including a photoelectric converter which receives an image of an object and photoelectrically converts the image, said first unit executes a predetermined process on the image received by said photoelectric converter based on a parameter and thus generates an image data representing the image, said first unit adjusting the parameter based on the image data;

an auxiliary light emitting unit for emitting auxiliary light to the object to be photographed; and a second unit for controlling the emission of auxiliary light by said auxiliary light emitting unit, said second unit outputting a signal representing execution of the auxiliary light emission to said first unit;

wherein the first unit excludes from adjusting the parameter for images received during the emission of the auxiliary light.

20. An electronic still camera comprising:

a first unit including a photoelectric converter which receives an image of an object and photoelectrically converts the image, said first unit executes a predetermined process on the image received by said photoelectric converter based on a parameter and thus generates an image data representing the image, said first unit adjusting the parameter based on the image data and outputting a signal representing execution of the parameter adjustment;

an auxiliary light emitting unit for emitting auxiliary light to the object to be photographed; and a second unit for controlling the emission of auxiliary light by said auxiliary light emitting unit, said second unit receiving the signal outputted from said first unit;

wherein the second unit prevents output of the signal during auxiliary light emission.

21. An electronic still camera comprising:

a photographing unit for receiving a plurality of images of an object to be photographed, each image being adjusted based at least in part on a feedback control parameter;

an auxiliary light emitting unit for emitting auxiliary light to the object to be photographed; and a parameter adjusting unit for adjusting said feedback control parameter based on a current image for use by the photographing unit in generating a next image, said parameter adjusting unit excluding images received by the photographing unit during auxiliary light emission by said auxiliary light emitting unit.

22. An electronic still camera as claimed in claims 21, wherein said feedback control parameter from a previous image is used for adjusting the next image during auxiliary light emission by said auxiliary light emitting unit.

23. An electronic still camera as claimed in claim 21, wherein said auxiliary light is emitted for at least one of distance measurement and red eye reduction.

24. An electronic still camera as claimed in claim 21, wherein said feedback control parameter is at least one of a time from start to end of photoelectric conversion by photographing unit and a gain of said photographing unit.

25. An electronic still camera comprising.

a photographing unit for receiving a plurality of images of an object to be photographed, each image being adjusted based at least in part on a feedback control parameter;

an auxiliary light emitting unit for emitting auxiliary light to the object to be photographed; and a parameter adjusting unit for adjusting said feedback control parameter based on a current image for use by the photographing unit in generating a next image, said parameter adjusting unit excluding images received during auxiliary light emission by said auxiliary light emitting unit.

26. An electronic still camera as claimed in claim 25, wherein said auxiliary light is emitted for at least one of distance measurement and red eye reduction.

27. An electronic still camera as claimed in claim 25, wherein said feedback control parameter is at least one of a time from start to end of photoelectric conversion by photographing unit and a gain of said photographing unit.

28. An electronic still camera comprising:

a photographing unit for receiving a plurality of images of an object to be photographed, said photographing unit generating adjusted images based at least in part on a feedback control parameter;

an auxiliary light emitting unit for emitting auxiliary light to the object to be photographed;

a parameter adjusting unit for adjusting said feedback control parameter based on a current image for use by the photographing unit in generating a next image, said parameter adjusting unit excluding images received by said photographing unit during auxiliary light emission by said auxiliary light emitting unit; and a display unit for displaying said adjusted images, said display unit excluding adjusted images adjusted by said photographing unit during auxiliary light emission by said auxiliary light emitting unit.

29. An electronic still camera as claimed in claim 28, wherein said feedback control parameter from a previous image is used for adjusting the next image during auxiliary light emission by said auxiliary light emitting unit.

30. An electronic still camera as claimed in claim 28, wherein said auxiliary light is emitted for at least one of distance measurement and red eye reduction.

31. An electronic still camera as claimed in claim 28, wherein said feedback control parameter is at least one of a time from start to end of photoelectric conversion by photographing unit and a gain of said photographing unit.

* * * * *